(12) United States Patent
Steele et al.

(10) Patent No.: US 7,016,877 B1
(45) Date of Patent: Mar. 21, 2006

(54) CONSUMER-CONTROLLED LIMITED AND CONSTRAINED ACCESS TO A CENTRALLY STORED INFORMATION ACCOUNT

(75) Inventors: Nick Steele, Powder Springs, GA (US); Stan Hawkins, Snellville, GA (US); Joe Maranville, Roswell, GA (US); Andrew Bradnan, Seattle, WA (US)

(73) Assignee: enfoTrust Networks, Inc., Kennesaw, GA (US)

( * ) Notice: Subject to any disclaimer, the term of this patent is extended or adjusted under 35 U.S.C. 154(b) by 565 days.

(21) Appl. No.: 10/007,785

(22) Filed: Nov. 7, 2001

Related U.S. Application Data

(63) Continuation-in-part of application No. 09/974,766, filed on Oct. 9, 2001, which is a continuation-in-part of application No. 09/933,567, filed on Aug. 20, 2001, and a continuation-in-part of application No. 09/923,285, filed on Aug. 6, 2001.

(60) Provisional application No. 60/245,867, filed on Nov. 7, 2000, provisional application No. 60/238,847, filed on Oct. 6, 2000, provisional application No. 60/226,117, filed on Aug. 18, 2000, provisional application No. 60/223,232, filed on Aug. 4, 2000.

(51) Int. Cl.
*G06Q 99/00* (2006.01)
*H04L 9/00* (2006.01)

(52) U.S. Cl. .............................. 705/50; 705/51; 705/67

(58) Field of Classification Search .................. 705/50, 705/51, 67; 713/201

See application file for complete search history.

(56) References Cited

U.S. PATENT DOCUMENTS

| | | | |
|---|---|---|---|
| 5,794,259 A | 8/1998 | Kikinis | 707/507 |
| 5,815,665 A | 9/1998 | Teper et al. | 395/200.59 |
| 5,872,850 A | 2/1999 | Klein et al. | 380/49 |
| 5,911,141 A | 6/1999 | Kelley et al. | 707/10 |
| 6,005,939 A | 12/1999 | Fortenberry et al. | 380/21 |
| 6,073,106 A | 6/2000 | Rozen et al. | 705/3 |
| 6,125,352 A | 9/2000 | Franklin et al. | 705/26 |
| 6,192,380 B1 | 2/2001 | LIght et al. | 707/505 |
| 6,199,079 B1 | 3/2001 | Gupta et al. | 707/507 |

(Continued)

FOREIGN PATENT DOCUMENTS

WO  WO 01/46783  6/2001

OTHER PUBLICATIONS

"Choicepoint Unviels New Web-based Pre-employment Screening Service", Business Wire p. 1287 May 17, 1999.*

(Continued)

*Primary Examiner*—Salvatore Cangialosi
(74) *Attorney, Agent, or Firm*—King & Spalding LLP

(57) ABSTRACT

Consumer authentication information is associated with an information account stored in a central database, such that access to the information account by the consumer is conditioned upon receipt and verification of the consumer authentication information. A temporary authorization may also be associated with the information account. The temporary authorization has consumer-defined attributes that define access privileges to be granted to a person who presents the temporary authorization along with a request for further access to the information account. The temporary authorization may be transmitted to the consumer for presentation to a third-party of the consumer's choice. Alternately, the temporary authorization may be transmitted to a designated third-party or device on behalf of the consumer.

59 Claims, 12 Drawing Sheets

U.S. PATENT DOCUMENTS

| | | | |
|---|---|---|---|
| 6,208,659 B1 | 3/2001 | Govindarajan et al. | 370/410 |
| 6,233,608 B1 | 5/2001 | Laursen et al. | 709/217 |
| 6,247,029 B1 | 6/2001 | Kelley et al. | 707/507 |
| 6,253,203 B1 | 9/2001 | O'Flaberry et al. | 707/9 |
| 6,098,347 A1 | 10/2001 | Wesley | 707/10 |
| 6,321,339 B1 * | 11/2001 | French et al. | 713/201 |
| 2001/0011250 A1 | 8/2001 | Palatengbe et al. | 705/41 |
| 2002/0002684 A1 | 1/2002 | Fox et al. | 713/200 |

OTHER PUBLICATIONS

*Implementing Mobile Passport*, pp 1-5.
Webpage entitled: "Zkey—Corporate", available at www.zkey.com, 1 page.
Alan Cohen and Walaika Haskins, "Grab-and-Go Web", *PC Magazine*, Oct. 19, 2000, pp. 1-3.
Webpage entitled: LinkUall.com—Products—Calendars and Address books, available at www.linkuall.com, pp. 1-2.
Webpage entitled: "LinkUall.com—About Us—LinkUall Technology", available at www.linkuall.com, 1 page.
Microsoft PressPass, *Microsoft.NET*: "A Platform for the Next Generation Internet", Jun. 22, 2000, pp. 1-7.
Microsoft Press Release. "Microsoft Passport Offers Streamlined Purchasing Across Leading Web Sites", Oct. 11, 1999, pp. 1-4.
Graeme Bennett, *PC Buyer's Guide.com.*, (updated Jun. 22, 2000), "NGWS—Microsoft's Dot Net Strategy", pp. 1-5.
Webpage entitled: "Microsoft Passport: A single name, password and wallet for the web", available at www.passport.com, pp. 1-2.
Webpage entitled: "Microsoft Passport *Member Services*, What is Passport", available at www.passport.com, pp. 1-12.
Webpage entitled: "Microsoft Passport: Streamlining Commerce and Communication on the Web", available at www.passport.com, Oct. 11, 1999, pp. 1-3.
Webpage entitled: "Online Businesses Use Microsoft Passport Single Sign-In and Wallet Services to Provide Customers with Secure and Convenient Shopping", available at www.microsoft.com, May 17, 2000, pp. 1-2.
Garry Gunnerson, "EZ Login", *PC Magazine*, pp. 1-2, Mar. 14, 2000.
"Ezlogin.Com Introduces Liveclips, Enabling Net Users To Clip Content From Anywhere On The Web And Paste It On A Custom Page", Java Industry Connection, Mar. 8, 2000, pp. 1-2.
Webpage entitled: "724 Solutions—Products—Wireless Internet Platform", available at www.724.com, pp. 1-3.
Webpage entitled: "724 Solutions—Products—m-Commerce", available at www.724.com, pp. 1-4.
Webpage entitled: "724 Solutions—Products -Financial Services", available at www.724.com, 1 page.
Gator Press Release "Gator.Com Delivers on the Promise of the Electronic Commerce Modeling Language (ECML) Standard Today: Gator offers one-click shopping at over 5,000 e-commerce sites today", Jun. 14, 1999, pp. 1-2.
Gator Press Release "Internet Start-up Gator.com Introduces Gator, the Web's First Smart Online Companion: New Internet product offers one-click login and express registration and checkout across the web", Jun. 14, 1999, pp. 1-3.
Gator Press Release "Gator Helps Consumers at More Than 25,000 E-Commerce and Registration Sites in First Month of Usage: Software and invaluable companion For more than 80,000 online consumers", Aug. 3, 1999, pp. 1-2.
Webpage entitled: "Affiliate Application" *How do Gator, Price Helper, and OfferCompanion Work?*, available at www.gator.com, 1 page.
Webpage entitled: "Yodlee: e-Personalization Solutions", available at www.yodlee.com, pp. 1-2.
Webpage entitled: "Yodlee: e-Personalization Platform", available at www.yodlee.com, 1 page.
Webpage entitled: "Yodlee: e-Personalization Applications", available at www.yodlee.com, 1 page.
Webpage entitled: "Yodlee for Web: One-Click Access to All Personal Accounts", available at www.yodlee.com, 1 page.
Webpage entitled: "Yodlee for Mobile: Simplify Your Life on the Road with Yodlee2Go", available at www.yodlee.com, 1 page.
Webpage entitled: "Yodlee2Go: Palm OS Wireless", available at www.yodlee.com, 1 page.
Webpage entitled: "Yodlee2Go: Web-enabled Phones", available at www.yodlee.com, 1 page.
Webpage entitled: "Security Overview", available at www.yodlee.com, pp. 1-2.
Webpage entitled: "Co-Brand Partner Opportunities", available at www.yodlee.com, pp. 1-2.
Webpage entitled: "Content Partner Opportunities", available at www.yodlee.com, 1 page.
Webpage entitled: "Sweet Enonymity", available at www.enonymous.com, pp. 1-2 (Nov. 23, 1999).
Webpage entitled: "Vision For An Enonymous Infomediary", available at www.enonymous.com, pp. 1-3.
Webpage entitled: "Learn More", available at www.digitalme.com, pp. 1-2.
Webpage entitled: "Take Control", available at www.digitalme.com, pp. 1-2.
Webpage entitled: "Make it Convenient", available at www.digitalme.com, pp. 1-3.
Webpage entitled: "Create Relationships", available at www.digitalme.com, pp. 1-2.
Webpage entitled: "FAQ", available at www.digitalme.com, pp. 1-2.
Webpage entitled: "Digitalme™ Fact Sheet (www.digitalme.com)" available at www.digitalme.com, pp. 1-3.
Microsoft NET Passport Technical Overview, Sep. 2001, entire article.
Microsoft NET Passport, "What's New ", Sep., 2001, entire article.
Webpages entitled; "Free Password Manager - Store passwords - Desktop or Online ", available at www.passwordsafe.com, 1 page.
Secure Your Web Site With Passport, "Implement Passport ", *Visual Studio Magazine* , pp. l-3.
Jon Rauschenberger, *Secure Your Web Site With Passport*, "Simplify Your Web Site Visitors' Experience By Authenticating Them", *Visual Studio Magazine*, pp.1-3.
*Secure Your Web Site With Passport*, "Sign In, Please", *Visual Studio Magazine*, pp. 1-3.
*Secure Your Web Site With Passport*, "Passport Key to HailStorm's Success", *Visual Studio Magazine*, pp. 1-2.

* cited by examiner

110

204

202

206

208

```
<XML>
<Information Account>
    <Account_Name> John Doe_5 </Account_Name>
    <Account_No> 34153443.3.2 </Account_No>
    <Name>
        <First_Name> John </First_Name>
        <Last_Name> Doe </Last_Name>
        <Middle_Name> Michael </Middle_Name>
        <Title> Mr. </Title>
        <Suffix> Jr. </Suffix>
    </Name>
    <DOB>
        <DOB_Month> January </DOB_Month>
        <DOB_Day> 1 </DOB_Day>
        <DOB_Year> 1960 </DOB_Year>
    </DOB>
    <Personal_Contact_Info>
        <Home_Phone preferred="yes"> 555.555.555 </ Home_Phone>
        <Work_Phone> 555.555.1111 </ Work_Phone>
        <Cell_Phone> 222.333.444 </ Cell_Phone>
        <Home_Email> doe@homeisp.com.</ Home_Email>
        <Work_Email> jdoe@workisp.com.</ Work_Email>
        <Home_Addressl>
            .
            .
            .
        . </Home_Addressl>
        .
        .
    </Personal Contact_Info>

<My_Documents>
        <Doc1>
            .
            .
            .
        </Doc1>
        .
        .
        .
    <My_Documents>
    .
    .
    .

</Information Account>
</XML>
```

302a
```
<XML>
<Information Account>
  <Account_Name> John Doe_5 </Account_Name>
  <Account_No> 34153443.3.2 </Account_No>
  <Profile>
    <First_Name> John </First_Name>
    <Last_Name> Doe </Last_Name>
    <Middle_Name> Michael </Middle_Name>
    <Title> Mr. </Title>
    <Suffix> Jr. </Suffix>
    <DOB_Month> January </DOB_Month>
    <DOB_Day> 1 </DOB_Day>
    <DOB_Year> 1960 </DOB_Year>
    .
    .
  </Profile>
</Information Account>
<XML>
```
304

302b
```
<XML>
<Information Account>
  <Account_Name> John Doe_5 </Account_Name>
  <Account_No> 34153443.3.2 </Account_No>
  <Information Product_X>
    <First_Name> John </First_Name>
    <Last_Name> Doe </Last_Name>
    .
    .
  </Information Product_X>
</Information Account>
</XML>
```

302c
```
<XML>
<Information Account>
  <Account_Name> John Doe_5 </Account_Name>
  <Account_No> 34153443.3.2 </Account_No>
  <Passport_Product>
    <First_Name> Pointer to First_Name in "Profile" </First_Name>
    <Last_Name> Pointer to Last_Name in "Profile" </Last_Name>
    Passport Number
    .
    .
  </Passport_Product>
</Information Account>
</XML>
```
306

110

CONSUMER-CONTROLLED LIMITED AND CONSTRAINED ACCESS TO A CENTRALLY STORED INFORMATION ACCOUNT

RELATED APPLICATIONS

The present application claims the benefit of U.S. Provisional Patent Application Ser. No. 60/245,867 filed Nov. 7, 2000, which is hereby incorporated by reference as if set forth fully herein, and is further a continuation-in-part of each of the following co-pending applications, all of which are hereby incorporated by reference as if set forth fully herein:
  U.S. application Ser. No. 09/974,766 filed Oct. 9, 2001 (which claims the benefit U.S. Provisional Patent Application Ser. No. 60/238,847 filed Oct. 6, 2000);
  U.S. application Ser. No. 09/933,567 filed Aug. 20, 2001 (which claims the benefit of U.S. Provisional Patent Application Ser. No. 60/226,117, filed Aug. 18, 2000); and
  a U.S. application Ser. No. 09/923,285 filed on Aug. 6, 2001 (which claims the benefit of U.S. Provisional Patent Application Ser. No. 60/223,232, filed Aug. 4, 2000.

TECHNICAL FIELD

The field of the present invention relates generally to systems and methods for the storage, management, and delivery of user or consumer information on or over a network. More particularly, the present invention relates to systems and methods for providing third-parties with access to user or consumer information stored in a network-accessible information account.

BACKGROUND OF THE INVENTION

In many situations, it is necessary or desirable for consumers or others to provide personal information to third parties, such as vendors or service providers, to obtain goods or services, facilitate transactions, or for other purposes. However, providing personal information to third parties, whether in verbal, written or electronic form, can be a tedious, inconvenient and repetitious task. Each time an individual provides personal information to a new recipient, a possibility exists that errors will occur, particularly if the information is conveyed orally. Moreover, when personal information is provided or stored in paper form, it can be burdensome to carry, deliver and/or manage paper files in order to conduct personal and business affairs. In the context of electronic data transactions, such as those conducted over the Internet, consumers are often reluctant to convey personal information due to security concerns. Also, certain aspects of a consumer's personal information (e.g., address, phone number, etc.) may change from time to time, which can cause third party records (paper or electronic) to become inaccurate or out of date. Thus, there is a need for a convenient, less error-prone and more secure system for allowing the consumer the ability to conveniently manage, distribute and update the consumer's information, to ensure that third parties are provided with accurate and up-to-date information, and to prevent unauthorized access to the information.

Furthermore, as information technology and network technology become more prolific, people find themselves repeatedly and manually inputting the same data into different computer systems. For example, consumers may find themselves having to manually input their personal and billing information via each vendor website through which they choose to complete an electronic commerce ("e-commerce") or mobile commerce ("m-commerce") transaction. As the number of secure websites grows, consumers also find themselves having to manage numerous usernames and passwords. Thus, there is a further need for a convenient and secure system for automating the management of consumer information.

Automated or partially automated solutions for managing information historically have largely been localized processes. Using conventional techniques, users are able to create and store data files containing personal information on their personal computers or other client devices, such as personal digital assistants ("PDAs"), pagers, mobile telephones, etc. The data elements in such data files can be shared using specialized applications for filtering data out of the data file and into another application. However, such systems typically require a permanent download of proprietary data management software that might not be compatible among different devices. In addition, the data management software and data files are often stored on only a single personal computer or computerized device. If the personal computer or other computerized device becomes lost or stolen, the user's data may no longer be accessible, and might end up in the possession of another person. If the personal computer or other computerized device crashes, the data can easily be lost.

Accordingly, there remains a need for a more secure, flexible and convenient system for storing information and a method for allowing the user to manage and distribute that information using a personal computer or other network-connected device. There further remains a need for such a system and method that provides central information storage and does not necessarily require a permanent download of proprietary software to a client device for management and distribution of the information. Additionally, there is a need for a mechanism that provides the consumer with a convenient means for making information available to third parties, and for updating the information when necessary or allowing others to update the information on the consumer's behalf.

SUMMARY OF THE INVENTION

The present invention generally relates to systems and methods for storing, managing and distributing consumer information via a distributed network, such as the Internet. In general, a system and method are provided for allowing a consumer to authorize trusted third parties to access a central information storage and retrieve and/or update information on behalf of the consumer.

In one embodiment, a data repository accessible via a distributed network stores an information account comprising a plurality of consumer information elements associated with a consumer. The consumer information elements may generally be accessed, retrieved and altered by the consumer. Access to the information account may be conditioned upon receipt and verification of authentication information (e.g., username, password, etc.,). At the user's request, one or more temporary authorizations (also referred to herein as "tickets," authorization codes or authorization identifiers) may be associated with the information account. The temporary authorization has associated therewith consumer-defined attributes (also referred to as authorization parameters) that define access privileges which are to be granted to a person or other entity that presents the temporary authorization along with a request for further access to the information account. The consumer-defined attributes may specify, for example, a number of times that the temporary authorization may be used to access the information account, a period of validity associated with the temporary authorization, a type of consumer information elements that can be accessed, and a specification of read, write and/or modify privileges, and so on. The consumer-defined attributes may further specify a filter identifier that identifies a specific filter or filter type to be used to ensure that only authorized data is filtered for release to the party who presents the temporary authorization.

Authorization to access the information account may be granted in any of a variety of ways, depending upon the nature of the system and the form in which the temporary authorization is implemented. According to one technique disclosed herein, a temporary authorization is provided to a third-party requiring access to at least a portion of the information account. For example, a temporary authorization may be transmitted to the consumer for presentation to a third-party of the consumer's choice. Alternately, the temporary authorization may be transmitted to a designated third-party on behalf of the consumer, such as by emailing the temporary authorization to an email account designated by the consumer or by storing the temporary authorization in a third-party's information account stored in the central data repository. The temporary authorization may also be embedded as a parameter in a uniform resource locator, which may be used to re-direct a browser operated by the consumer to a web page associated with the third-party. In such an embodiment, a server hosting the web page may be configured to extract the temporary authorization from the uniform resource locator and to transmit a request for access to the information account along with the temporary authorization on behalf of the third-party.

Additional embodiments, examples, variations and modifications are also disclosed herein.

BRIEF DESCRIPTION OF THE DRAWINGS

FIG. 2 is an abstract illustration of an information account in accordance with exemplary embodiments as may be used, for example, in the system illustrated in FIG. 1.

FIG. 3 is an abstract illustration of another information account in accordance with other exemplary embodiments as may be used, for example, in the system illustrated in FIG. 1.

DETAILED DESCRIPTION OF EXEMPLARY EMBODIMENTS

Figure 1:
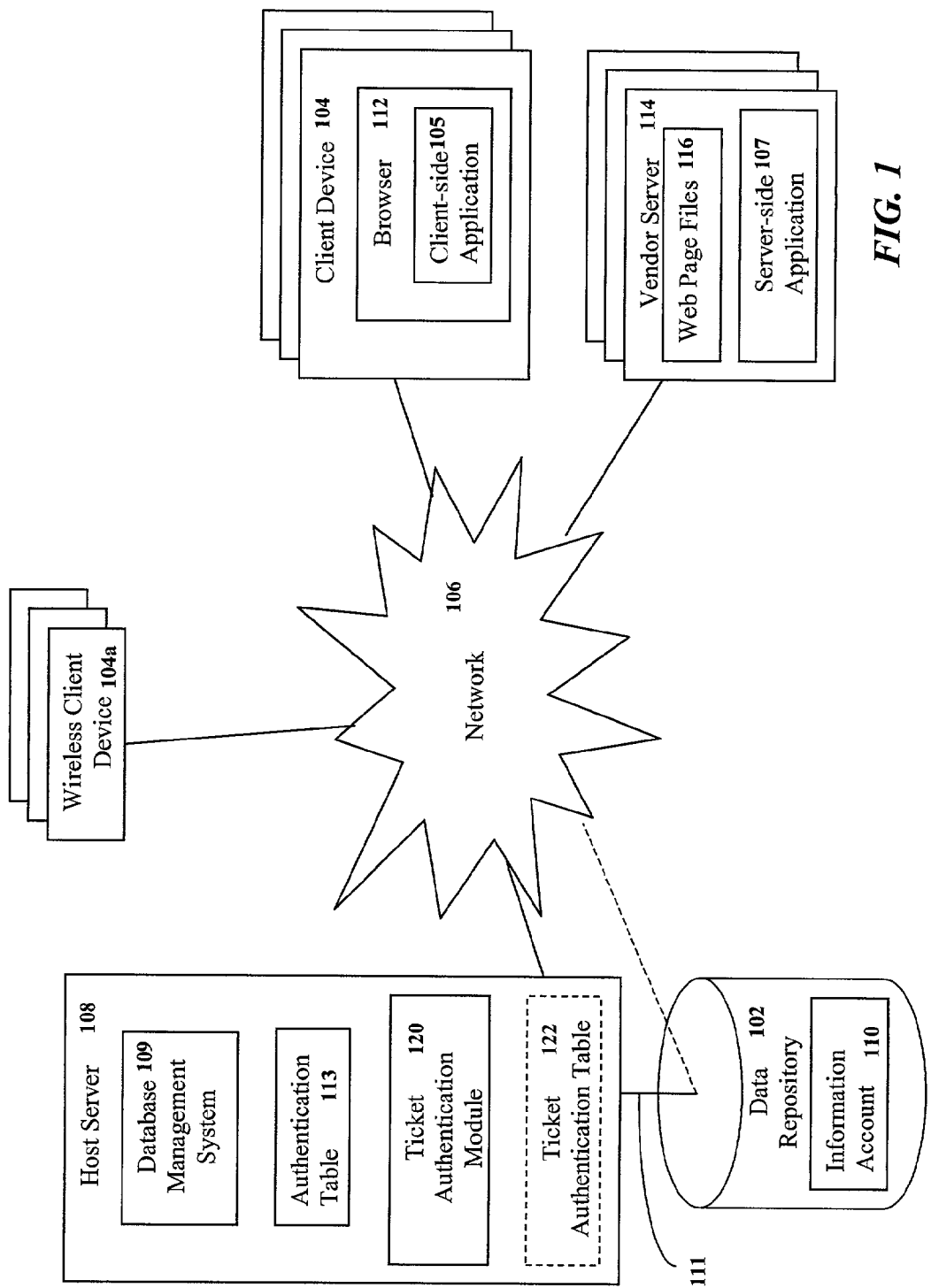
FIG. 1 is a high-level block diagram illustrating a system in accordance with one or more exemplary embodiments as disclosed herein.

In one or more embodiments, a system and method are provided for enabling consumers to store and maintain a comprehensive information profile (hereinafter "information account") in a centralized data repository that is accessible over a distributed electronic network, such as the Internet. The information account may be used to store any type of data desired by the consumer, including, for example, demographic information, financial information, medical information, family information, contact information, documents, image files, multimedia files, etc. The centralized data repository is preferably accessible via a network by any authorized network device. In various embodiments, no specialized application programs are required to be permanently downloaded to the consumer's network device in order to access the information account.

According to certain embodiments, at the consumer's direction, selected information in the information account may be accessed and, if desired, shared with authorized vendors, business partners or any other entity that requires certain of the consumer's information. The terms "vendor" and "business partner" are used herein in a general sense to refer to persons, businesses, enterprises or entities that make products or services available to consumers. As used herein, the terms "consumer," "buyer," and "user" are interchangeable.

Server-side software or temporary client-side software may, in some embodiments, be used to manage communications with the information account and to automatically integrate that consumer information into a process executed by a network device. As an example, the network device may execute a business process relating to a consumer-initiated activity, such as a retail transaction. The server-side software or temporary client-side software may receive consumer information from the information account and use that information to automatically populate the input fields of a form or the input requirements of a process that is to be submitted to a vendor's server or other network device during an application, registration or transaction process.

The data in the information account is preferably stored using a tagged data format. In one embodiment, the data in the information account may be stored using the eXtensible Markup Language ("XML") data format, which is an open standard for describing data from the World Wide Web Consortium ("W3C"). As is known in the art, XML tags are used to define the types of information that are represented by the data element. The XML standard provides a great deal of flexibility in that custom tags may be defined for any type of information that the consumer may desire to store in the information account. Using any well-known XML-related querying, parsing, transforming and/or filtering techniques, individual data elements in the information account may be accessed, updated, deleted, created, or otherwise manipulated.

The information account may be structured as one or more data aggregates, e.g., XML data aggregates. An entire XML data aggregate is stored within a data field of a database table. This data field is a long text field containing all of the information associated with the given record. In one embodiment, all consumer information in the information account may be stored in a single XML data aggregate comprising consumer information elements and sub-elements. Attributes may also be associated with any element and sub-element in order to provide additional information. A transformation or filtering mechanism, such as "Style Sheets," may be applied to the single XML data stream in order to extract only selected data elements therefrom at the direction of the consumer.

In an alternative embodiment, the information account may be normalized into a plurality of discrete data aggregates, each aggregate representing a predetermined "information product." An information product refers to a package of consumer information relating to, for example, a specific product or service offered by a vendor or that is important to vendors with similar consumer information needs. For example, a mortgage information product might contain all consumer information that would be required to complete a lender's mortgage application. Individual information products may be retrieved from the information account and transmitted to authorized vendors at the request of the consumer.

Access constraints may be utilized in one or more embodiments as described herein to allow for the establishment of "exchanges." An exchange generally refers to a group of entities that are authorized to accept consumer information from the information account at the request of the consumer. The information account may be accessed for retrieval of information to be used in commerce with any vendor or entity that is a member of the exchange. In much the same way that a consumer may have several different credit cards or debit cards that are each accepted only by certain merchants, the consumer may have several information accounts that are each valid only on specified exchanges.

Exchanges may be implemented, for example, through "inflow" and/or "outflow" constraints imposed by the exchanges. An inflow constraint imposed by an exchange may, for example, dictate that only information accounts associated with specific other exchanges will be accepted or that no information accounts associated with other exchanges will be accepted. An outflow constraint may dictate that information accounts associated with an exchange may only be used within that exchange and within no other exchanges. Various business situations and partnerships may drive the implementation of inflow and outflow constraints. Revenue sharing models may be established in order to provide financial incentives to exchanges and/or individual vendors that facilitate the creation of an information account or the use of an information account to complete a transaction.

Exemplary embodiments will now be described with reference to the drawings, in which like numerals represent like elements throughout the several figures. A high-level block diagram of a system in accordance with an exemplary embodiment is shown in and described with reference to FIG. 1. As shown, a central data repository 102 is provided for storing consumer information that may be easily accessed from any network device attached to the network 106. The network 106 may comprise any telecommunication and/or data network, whether public or private, such as a local area network, a wide area network, an intranet, an internet and any combination thereof and may be wireline and/or wireless. Various methodologies as described herein may be practiced in the context of distributed computing environments. The network 106 thus provides for the open and seamless distribution of consumer information to and from the information account 110.

In the system illustrated in FIG. 1, the exemplary operating environment encompasses various network devices for accessing and reading associated computer-readable media having stored thereon data and/or computer-executable instructions for implementing various methods of the present invention of data storage, management and distribution. Generally, a network device includes a communication device for transmitting and receiving data and/or computer-executable instructions over the network 106, and a memory for storing data and/or computer-executable instructions. A network device may also include a processor for processing data and executing computer-executable instructions, as well as other internal and peripheral components that are well known in the art (e.g., input and output devices.) As used herein, the term "computer-readable medium" describes any form of computer memory or a propagated signal transmission medium. Propagated signals representing data and computer-executable instructions are transferred between network devices.

A network device may generally comprise any device that is capable of communicating with the resources of the network 106. A network device may comprise, for example, a network server 108 & 114, a client device 104, a wireless client device 104a or a dedicated storage device (e.g., the central data repository 102.) In the embodiment shown in FIG. 1, a host server 108 hosts the software for interacting with the central data repository 102 and for communicating with other network devices. The host server 108 may interact with the central data repository 102 via the network 106 or via a direct communication link 111. A vendor server 114 hosts vendor web page files 116 comprising a vendor website, through which products or services may be offered to consumers.

A client device 104 may comprise a desktop computer, a laptop computer and the like. A wireless client device 104a may comprise a personal digital assistant (PDA), a digital and/or cellular telephone or pager, a handheld computer, or any other mobile device. These and other types of client devices 104 & 104a will be apparent to one of ordinary skill in the art. For convenience, the following explanation will be made with reference to a client device 104 generically, but, unless otherwise indicated, it will be understood that the principles and concepts described will also encompass wired or wireless devices, such as wireless client device 104a illustrated in FIG. 1. Moreover, although exemplary embodiments will be described herein in the context of the Internet or a web-based environment, it will be appreciated that the various principles and methods of operation will be applicable or may be practiced in other environments as well.

According to a preferred embodiment, a client device 104 may execute a browser 112 or another suitable application for interacting with web page files 116 hosted by a vendor server 114 and other network devices. Through the graphical user interface provided by a displayed web page file 116, the vendor may require the consumer (i.e., the operator of the client device 104) to input certain information pertaining to or associated with the consumer. According to certain embodiments, a consumer may be permitted to direct that the requested information be transmitted from the information account 110 to the client device 104 for processing. Although exemplary embodiments will be described herein in the context of a web-based environment, those skilled in the art will appreciate that other environments are suitable as well.

The description of exemplary embodiments with reference to FIG. 1 assumes the existence of a previously created information account 110. An example illustrating actual creation of an information account 110 will be described below with reference to FIG. 6. In general, the information account 110 may be any data structure for storing consumer information. Preferably, however, the information account 110 is stored as a tagged data structure, such as one or more XML data aggregates. The data in the information account 110 is preferably encrypted so that anyone gaining unauthorized access to the information account 110 will not be able to read the data. Also, in a preferred embodiment, each information account 110 in the central data repository 102 is encrypted separately, so that someone authorized to access the information account of one consumer may not also gain access to the information account of another consumer.

In accordance with a preferred embodiment, the consumers may maintain sole responsibility for storing and updating the information in the information account 110. Only the consumer, or those authorized by the consumer, may use the information account 110 to complete e-commerce or m-commerce activities. Consumers create an information account 110 either through a website hosted by the host server 108 or a website hosted by a vendor server 114. For example, after manually completing a form displayed by a vendor's website, the consumer can choose to create an information account 110 and have the consumer information stored therein.

Upon creation of an information account 110, a consumer may be given an identification number, a username and/or a password. Other types of consumer authentication information are known in the art and may also be used in the context of the present invention. The system of FIG. 1 provides the consumer with a variety of methods of accessing the information account 110, transferring selected information to a vendor and/or allowing a vendor limited and constrained access to the information account 110, as described in further detail herein.

A web page file 116 displayed by the browser 112 may include input fields for the input of consumer information. The web page file 116 may also include an instruction (e.g., a "call") that causes the browser 112 to download and execute a client-side application 105. JAVA applets are well known client-side applications and are particularly suited for use in various embodiments due to their platform-independent nature. However, any other type of client-side application may be used without departing from the spirit and scope of the present invention. The client-side application 105 resides in temporary memory storage of the client device 104, such as cache memory or the like, and may be removed from the client device 104 after its execution is complete. The client-side application 105 is specific to the browser session only and not to the client device 104. Multiple client-side applications 105 may be executed at the same time if multiple browser windows are executed by the client device 104. The client-side application 105 provides functionality for facilitating communications between the browser 112 executed by the client device 104 and the database management system ("DBMS") 109 of the host server 108.

One responsibility of the client-side application 105 is to provide authentication information associated with the consumer and the vendor to the host server 108. Depending on the desired level of security within the system, authentication information may comprise a username, user ID, password, key, certificate and the like. Authentication information regarding the vendor may be embedded within the web page file 116 for extraction by the client-side application 105. Alternatively, the client-side application 105 may communicate with the vendor server 114 to retrieve such vendor authentication information. Authentication information regarding the consumer may be supplied by the consumer via a user interface displayed by the client-side application 105 or by a displayed web-page file 116. Communications relating to authentication information may be accomplished using a secure transmission protocol or handshake, such as the secure shell BSD, Point to Point Tunneling Protocol (PPTP), also commonly know as Virtual Private Network, and/or secure socket layering (SSL) protocol. Other methods for achieving a secure connection over the network 106 will be apparent to those of ordinary skill in the art. Authentication information may also be encrypted and transmitted over an open network using any appropriate protocol.

The client-side application 105 is also responsible for determining the type of consumer information that is required by the input fields of the displayed web page file 116. After determining the type of consumer information that is required, the client-side application 105 may formulate a database query in a language that is understood by the DBMS 109. At a minimum, client-side application 105 communicates enough information to the DBMS 109 regarding the required consumer information so that the DBMS can formulate a database query. In one embodiment, the DBMS 109 exposes an application program interface ("API") that can be utilized by the client-side application 105. An example of one such API is known as the Simple Object Access Protocol ("SOAP"). SOAP is a protocol that provides for interoperability between heterogeneous HTTP-based software and XML-based software. SOAP provides access to services, objects, and servers in a platform-independent manner. Since SOAP relies on HTTP as the transport mechanism, and most firewalls allow HTTP to pass through, SOAP endpoints may usually be invoked from either side of a firewall.

The client-side application 105 may transmit the database query (or information to form the database query) to the host server 108 along with the above-mentioned authentication information over a secure connection. In such a scenario, the authentication information and the query information may be passed to the DBMS 109. The DBMS 109 attempts to authenticate the vendor and the consumer using the authentication information and corresponding information that was previously stored in the data repository 102. If authentication is successful, the DBMS 109 queries the information account 110 using the appropriate database connectivity protocol, such as the Open Database Connectivity ("ODBC") protocol, the Java Database Connectivity Protocol ("JDBC"), or any other suitable protocol.

As mentioned above, the data in the information account 110 may be encrypted. Thus, in response to the query, the DBMS 109 may receive an encrypted search result. The search result, for example, may be in the form of a stream of XML data that has been filtered from the information account. The DBMS 109 or other program module executed by the host server 108 may be responsible for decrypting the search result. The decrypted search results may then be transmitted to the client-side application 105 via the previously established or a new secure connection.

In the alternative, the client-side application 105 may manage authentication and querying as separate processes. As an example, authentication may be handled using a secure connection as described above. Upon acknowledgment of authentication, the secure connection may be closed and the query process may be handled using open network communication protocols. In response to the query, the encrypted search result may be transmitted to the client-side application 105 over the open network and the client-side application 105 may be responsible for decryption.

The client-side application 105 may also be responsible for parsing the data elements included in the search result and auto-populating the parsed data into the input fields of the displayed web page file 116. Again, the client-side application 105 may translate the XML data into HTTP data using SOAP or another suitable protocol. Those skilled in the art will appreciate that in certain embodiments, especially where user verification of the consumer information is not required, the client-side application 105 may transmit the consumer information directly to the vendor server 114 without populating the consumer information into the displayed web page file 116. If the input fields are auto-populated, the consumer has the opportunity to verify the information displayed in the input fields, make any necessary modifications, and then interact with the displayed web page file 116 to submit the information to the vendor server 114. Any modifications to the consumer information that are made by the consumer may be detected by the client-side application 105, which may then transmit the modified data back to the host server 108 for an appropriate update of the information account 110. In addition, the client-side application 105 may determine whether the consumer inputs new data into the input fields, and if so, transmit that new information to the host server 108 for storage in the data repository 102. The consumer may interact with the displayed web page file 116 to submit the consumer information to the vendor server 114. The vendor server 114 may then process the consumer information, as needed, by way of a processing module.

In an alternative embodiment, a server-side application 107 may be employed instead of a client-side application 105 to manage communications with the host server 108. An authorized server-side application 107 may receive consumer information directly from the host server 108 and present that consumer information to the client device 104 (e.g., via the browser 112) for display to the consumer. A web page file 116 hosted by the vendor server 114 may be accessed and displayed by the browser 112 of the client device 104. The displayed web page file 116 may present a user interface for input of consumer authentication information. In a preferred embodiment, the consumer authentication information is transmitted from the client device 104 to the host server 108 for authentication of the consumer. In addition, the client device 104 may also transmit a request that a "ticket" be provided to the vendor server 114.

In addition, in various embodiments, the client device 104 may transmit a request for a ticket, or a request that a ticket be provided to a vendor server 114. The term "ticket" in the present context generally refers to a temporary authorization (also referred to as an authorization code or authorization identifier) for at least partial access to a consumer's information account 110. A wide variety of mechanisms may be used to implement the provision of tickets in response to user requests. As shown in FIG. 1, for example, an information account 110 may be associated with information in a data table or other data structure, such as a ticket authentication table 122, that correlates one or more tickets with a set of consumer-defined attributes (also referred to as authorization parameters). The ticket authentication table 122 may reside at the host server 108, in the data repository 102, or in another suitable location.

The consumer-defined attributes of the ticket may be used to define the access privileges that will be granted to the person or other entity that presents the ticket in connection with a request for access to the information account 110. The consumer-defined attributes of the ticket may specify such things as, for example, the number of times that the password may be used to access the information account 110 (e.g., one-time use), a period of validity associated with the ticket (e.g., ticket expires one week from issuance), whether the ticket carries read, write and/or modify privileges, etc. These are merely examples of consumer-defined attributes; in general, any type of restriction, limitation, condition or requirement may be specified as a consumer-defined attribute. Although a ticket is referred to herein as a temporary authorization, it should be understood that a ticket may have an indefinite period of validity. The ticket attributes may also include any other useful information, and may, for example, include any number of identifiers, such as a vendor identifier, a data identifier, and filter identifiers, which may be used to ensure that the party using the ticket is in fact authorized to do so, and to ensure that only authorized data is released to that party.

A ticket authentication module 120 may be executed by the host server 108 (or other network device, depending upon the nature of the system) and may be configured to receive and interpret (e.g., parse) a ticket, including any associated identifiers. The ticket authentication module 120 may further compare the ticket information against data in the ticket authentication table 122 in order to determine, for example, whether the ticket is being used by the authorized party during a valid time period and/or for an authorized purpose, and whether the ticket has expired. The ticket authentication module 120 may also use the ticket authentication table 122 to determine the access privileges (read, write and/or modify) associated with the ticket. Additional verification checks may be performed by the authentication module for added security. For example, a request for access to an information account may include a ticket as well as a vendor identifier (or the like), which may be verified against a ticket attribute defining authorized vendor identifiers. In certain embodiments, ticket attributes relating to filter identifiers may be passed from the ticket authentication module 120 to other program modules (not shown) in order to call or establish filters that control the amount and/or type of information to be released from the information account 110 to the third party.

Figure 12:
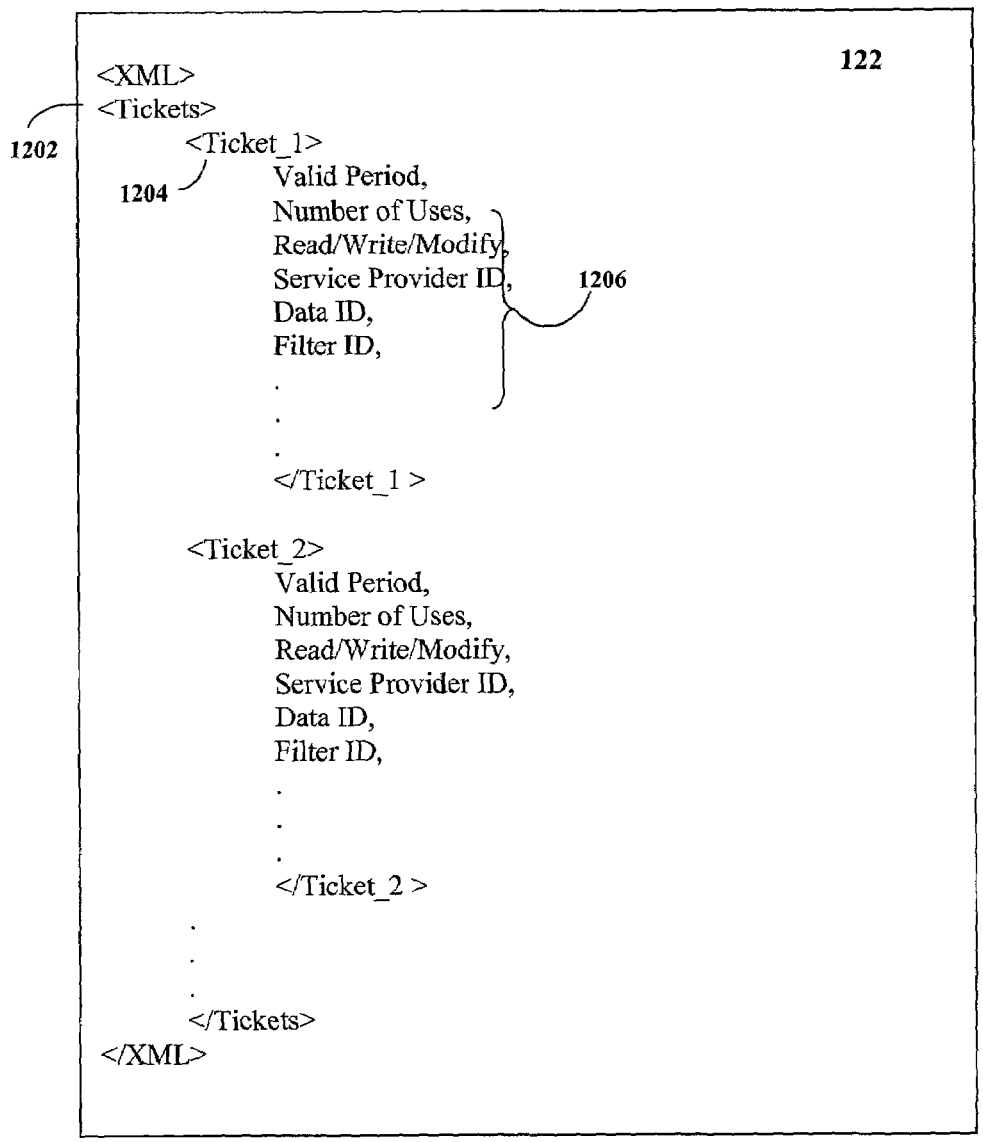
FIG. 12 is an abstract illustration of an exemplary "ticket" authentication table implemented as an XML data structure in accordance with certain exemplary embodiments.

An exemplary ticket authentication table 122 implemented as an XML data structure is shown in FIG. 12 by way of illustration (although the ticket authentication table need not be implement in an XML or other tagged data format). As shown, the authentication table 122 may comprise a main "Ticket" data structure 1202 that is made up of one or more "Ticket_n" (n=1,2,3 . . . ) sub-data structures 1204. Each "Ticket_n" sub-data structure 1204 may in turn include any number of consumer-defined attributes 1206. Those skilled in the art will appreciate that the authentication table 122 may be implemented as any searchable data structure and is not limited to an XML embodiment. In addition, those skilled in the art will recognize that the architecture and program modules shown in FIG. 1 are for illustrative purposes only. Other architectures, configurations and program modules may be implemented in accordance with the spirit and scope of the present invention.

The use of tickets allows a consumer to provide select third parties with access to the consumer's information account 110, on terms specified by the consumer. Thus, the consumer is able to delegate certain responsibilities for managing and/or accessing the data stored in the information account 110. The use of tickets in conjunction with an on-line central data repository 102 relieves the consumer from the burden of having to carry, deliver and/or manage paper files in order to conduct personal and business affairs. Instead, the consumer may simply authorize a third party to access the information account 110 and retrieve, insert and/or modify any necessary information on behalf of the consumer.

A ticket may be issued by the consumer to any third party, for any purpose. For example, the consumer may issue to his doctor a ticket that provides the doctor with access to the consumer's medical-related information stored within the information account 110. The doctor's ticket may carry read-only privileges or may allow the doctor to add new medical information to or modify existing medical information within the information account 110. The consumer may issue multiple tickets to multiple third parties (e.g., doctors, etc.) Each ticket may provide access to the same or different information and carry the same or different privileges. Also, the consumer may issue the same ticket to multiple third parties. In another example, the consumer may provide his trusted agent or representative (e.g., manager or attorney) with a ticket that authorizes full access to the information account 110 for an unspecified duration (i.e., until revoked by the consumer). As may be seen the present invention allows the consumer to control the types, amounts and recipients of information stored in a central on-line data repository. For clarity, it should be appreciated that the "ticket" provided to a third-party may refer to a unique authorization identifier or code, while the attributes associated with the ticket are stored separately therefrom, such as in the ticket authentication table 122. Alternatively, however, a ticket may in some embodiments comprise a authorization code or identifier having one or more of the authorization parameters incorporated or encoded therein.

The consumer may generate requests for establishment of tickets, for example, by interacting with an information account enabled web page file 116. The information account enabled web page file 116 may provide an interface for allowing the consumer to select or create attributes for the ticket. Tickets may be established for specific third-parties, or for general types of third-parties. For example, a specific ticket having specific attributes may be established for a specific doctor, while a general "medical" ticket may be established as a default ticket to be provided to a doctor in the absence of a specific ticket.

Tickets may be granted to third parties by the consumer or on behalf of the consumer. As an illustration, the consumer may sign-on to access the information account 110 using a client device 104 or mobile client device 104*a* and, once authenticated, request that a ticket be established. The ticket may be provided to the consumer, who may then communicate the ticket manually, verbally, electronically, etc. to a desired third-party. As another example, the consumer may request that the host server 108 deliver the ticket to a designated third-party via e-mail (e.g., to an email address or email account designated by the consumer) or any other suitable type of communication. A ticket may also be inserted into an information account 110 owned by the third party. The third party may then present the ticket to the host server 108, for example via an information account enabled website, in order to be authenticated to access the consumer's information account 110.

Tickets may also be delivered to a server associated with the third-party on behalf of the consumer. As an example, the host server 108 may authenticate the consumer using, e.g., standard browser authentication techniques. Upon authenticating the consumer, the host server 108 may redirect the browser 112 of the client device 104 to another web page data file 116 (e.g., another web page data file 116 hosted by of the vendor server 114), including the ticket as a parameter in the URL. In response to detecting the ticket, the vendor server may extract the ticket and pass it to a server-side application 107. The server-side application 107 may then use the ticket to authenticate itself to the host server 108, for example using SOAP or another suitable protocol.

In accordance with one embodiment as described herein, a ticket generated by the host server 108 may comprise a "Globally Unique Identifier" ("GUID"). A GUID preferably comprises a unique number that is computed by adding the time and date to a network adapter's internal serial number, or by any other suitable technique. The ticket may be encrypted. For example, the ticket may be encrypted using the vendor's public key and the resulting binary encrypted blob may be base64 encoded so that it can be included as a parameter in a URL. At the vendor server 114, the parameter may be extracted from the URL, base64 decoded and then decrypted using the vendor's private key. Other encryption techniques may also be used.

In various embodiments, consumer authentication information may be submitted from the client device 104 to the server-side application 107 at the vendor server 114. The server-side application 107 may then transmit the consumer authentication information and vendor authentication information to the host server 108 for authentication of both the consumer and the vendor. The consumer authentication information may be encrypted at the client device 104 and decrypted only at the host server 108. Such an embodiment tends to place a significant amount of control over the consumer's data in the hands of the vendor.

The server-side application may be identified by an application identifier ("APPID"). The APPID may be associated at the host server 108 (e.g., by the DBMS 109) with a particular filtering mechanism. As mentioned, style sheets are well-known and highly suitable filtering tools for use in conjunction with XML data. In response to authenticating the server-side application 107 and identifying the appropriate filter, consumer information may be filtered from the information account 110 and transmitted back to the server-side application 107. The server-side application 107 may then parse the consumer information, for example, in order to auto-populate a form, which may or may not have been previously displayed to the consumer.

As in the case of the client-side application 105, the server-side application 107 may receive decrypted consumer information from the host server 108 via a secure connection, or may receive encrypted consumer information via the open network. Thus, the server-side application 107 may be configured to perform decryption as necessary. The consumer information thus received from the host server 108 may be presented to the consumer for verification. Any modifications or additions made to the consumer information may be submitted back to the server-side application 107 for communication to the host server 108. The DBMS 109 may then update and/or create the information account 110 in the appropriate manner. The consumer may interact with the displayed web page file 116 to submit the consumer information to the vendor server 114. The vendor server 114 may then process the consumer information, as needed, by way of a processing module.

Those skilled in the art will appreciate that the illustration and discussion of exemplary embodiments with reference to FIG. 1 is provided as a generalized example only. Specific details regarding data formats and network communication protocols have been omitted, as such details are well known in the art. Furthermore, the present invention is not intended to be limited to the use of any particular data formats or protocols. Any existing or future formats or protocols may be used without departing from the spirit and scope of the invention. Furthermore, many network components were not shown or discussed with reference to FIG. 1, such as gateways, routers, hubs, switches, firewalls, DNS servers, authentication servers, certificate authorities, and the like. The functions and roles of such network components are also well known in the art and need not be described in detail herein.

FIG. 2 provides an abstract illustration of an information account 110 in accordance with an exemplary embodiment as described herein. In the illustrated embodiment, the consumer information is stored in the information account 110 as a single tagged (delimited) data stream. XML generally provides a suitable tagged data format; however, other tagged data formats can be employed as well. Thus, references to the XML standard in connection with exemplary embodiments are not intended to limit the scope of the present invention. The single XML data stream comprises a plurality of consumer information elements 202, each having a unique tag 204 or identifier. A consumer information element 202 may be divided into any number and/or level of sub-elements 206. As is well known in the art, an XML consumer information element 202 may also be associated with one or more attributes 208. An attribute 208 may provide additional information about the content, structure or formatting of a consumer information element 202.

A consumer information element 202 may comprise any type of data or information, including text strings, objects, files, applications, etc. Obviously, the more consumer information that is stored in the information account 110, the larger the XML data stream will be. The size of the XML data stream is limited only by the hardware and software limitations of the system (e.g., memory size, processor speed, bandwidth, etc).

An information account 110 is preferably unique to a single customer. Each information account 110 stored in the data repository 102 may thus comprise a discrete XML data stream. Each information account 110 stored in the data repository 102 may be individually encrypted. For example, one method for encrypting an information account 110 may involve use of the consumer's public key. Accordingly, only someone having access to the consumer's private key will be able to decrypt the consumer's information. Many other and/or additional methods for encrypting information accounts 110 and/or the entire data repository 102 will occur to those skilled in the art.

Although not shown in FIG. 2, those skilled in the art will appreciate that a consumer information element 202 in one information account 110 may comprise a pointer or a reference to another data element or to another information account 110. In one embodiment, a consumer may create, for example, a list of business contacts. A new information account may be created for each individual specified as a business contact by the consumer. Authentication data within the new information account may be set as "anonymous" so that the first consumer may retain access privileges. At some point later, however, the individual named as the business contact may be given control of the new information account by changing the associated authentication information to be unique to that individual. The first consumer may then be granted limited access privileges to continue to access the new information account of the business contact (e.g., by way of a ticket). Alternatively, the first consumer may retain a copy of the business contact information in his own information account.

FIG. 3 provides an abstract illustration of an information account 110 in accordance with other exemplary embodiments. In the embodiment shown, an information account 110 is structured as multiple discrete XML aggregates 302a–c. The discrete XML aggregates 302a–e may comprise one primary "profile" record 302a and one or more information product records 302b–c. The profile record 302a may include a general profile of information elements 304 associated with the consumer. Information product records 302b–c contain consumer information elements that, for example, are specific to a particular product or service offered by a vendor or that are important to vendors with similar consumer information needs. Aggregation of data elements according to information products allows quick and efficient retrieval of specific consumer information from the information account 110 through a request-response system.

The number of aggregates or records included within the information account 110 of a given consumer depends upon the number of information products for which the consumer has elected to store information. For example, a consumer who has elected to store information about two separate products, such as a car loan and a mortgage loan, would have at least three data aggregates in his information account 110. One such data aggregate would represent the primary profile record and each of the two other data aggregates would include information about one of the information products. Data aggregates may include but are not limited to the following information products: Home Loan, Auto Loan, Student Loan, Home Insurance, Auto Insurance, Life Insurance, Online Banking, Credit Card, Government Services, Education, Career, Travel, Retail, and Relocation. If a consumer creates or updates an information account via a vendor's web site and thereby inputs information regarding a new product, a new product record 302b–c will be created in the information account. Each product record 302b–c created for the consumer is of course associated with the primary profile record 302a.

If an information account 110 is segmented into multiple discrete data aggregates, there may be a need for maintaining consistency among redundant data elements stored in multiple information products. "Latent referential processing" is one method for maintaining data consistency, and in this context refers to the use of a series of pointers or references to flag data that is redundant across multiple products. According to latent referential processing, when a record 302a–c is created or updated, redundant information elements that are stored in other data aggregates typically are not also updated until the next time the information account is accessed. For example, if salary information is updated in a home loan information product record, redundant salary information in the consumer's auto loan information product record will generally not be immediately updated. Thus, latent referential processing allows data inconsistencies to exist within the information account after an update.

As is shown and described with reference to FIG. 4, a transaction log (e.g., a time stamp log) may be maintained for each redundantly stored aggregate in the information account to record the date and time of the most recent update for each data record 302a–c. Each time a request is made to access the information account, the DBMS 109 may first examine the time stamp log to determine which data element in a set of redundant data elements has most recently been updated. After determining the most recently updated data element, all other redundant data elements are updated to be consistent with the most recently updated data element. Upon completion of the latent referential processing, the request to access the information account may be granted. Accordingly, latent referential processing is a new way of storing and tracking information that addresses the need of providing quick access to information that will be accessed more frequently than it will be updated.

In another embodiment, redundancy and consistency concerns are addressed by normalizing the data aggregates of the information account 110 to the extent possible. For example, an information account 110 may be configured such that the consumer's profile record 302a stores the majority of the consumer's personal information. The profile record 302a may comprise predefined data elements, such as "first name," "middle name," "last name," "date of birth," etc. The profile aggregate 302a may also be expanded to include any additional and/or custom fields. Additional aggregates corresponding to information products 302c may contain pointers 306 to the data fields within the profile aggregate 302a. Thus, the information account 110 may be configured to store within one aggregate a single instance of an information element that is referenced by other aggregates. As information product aggregates 302c are formed independently of the profile aggregate 302a, data elements that are not unique to those information product aggregates 302c may be ported into the profile aggregate 302a if desired.

Figure 4:
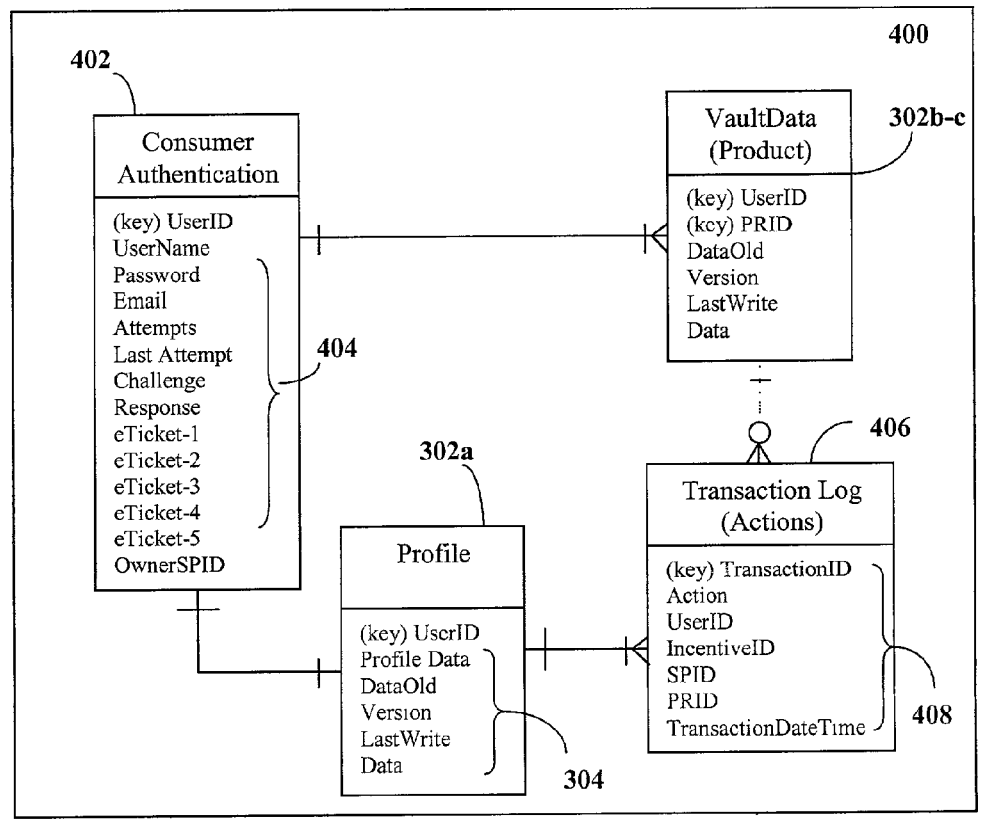
FIG. 4 is an abstract illustration of an exemplary database schema in accordance with certain exemplary embodiments.

FIG. 4 illustrates an exemplary database schema 400 in accordance with one or more exemplary embodiments as disclosed herein. In particular, the database schema 400 represents the situation where the information account 110 is segmented into multiple discrete data aggregates, as shown in FIG. 3. The database schema 400 may include a consumer authentication record 402 that stores consumer authentication information 404 such as, for example, a user ID, username, password, email address, access attempts, last attempt date/time, challenge word or phrase, challenge response, ticket parameters, and vendor credited with origination of the information account. These and other types of authentication information may be used to authenticate a consumer. The database schema 400 may also include a profile record 302a that stores a primary information profile 304 of the consumer. There will typically be a one to one relationship between the consumer authentication table 402 and the profile record 302a. The exemplary database schema 400 also includes one or more information product records 302b–c that store product-specific information. Each profile record 302a may be associated with one or many information product records 302b–c.

The profile record 302a and each information product record 302b–c may further be associated with a transaction log record 406. Each time the profile record 302a or an information product record 302b–c is acted upon, detailed transaction information 408 may be recorded in a new transaction log record 406 (not to be confused with the above-mentioned time stamp log.) Transaction information 408 may provide the basis for all transaction billing and revenue sharing events. By way of example only, the transaction record 406 may identify the vendor server through which the information account 110 was created. The transaction record 406 may also identify the vendor server through which a transaction was completed using the information account 110.

As used herein, the term "transaction" refers broadly to any activity related to an information account, including, but not limited to a create transaction, delete transaction, update transaction, authentication transaction, a request for information from authorized vendors, a client device and/or vendor server 114 request, a publishing and form filling transaction, and a submit transaction where the information account 110 is processed into the requesting vendors systems. A portion of any monies billed upon completion of a transaction may be shared with each of the vendor servers identified in the transaction record 406.

Figure 5:
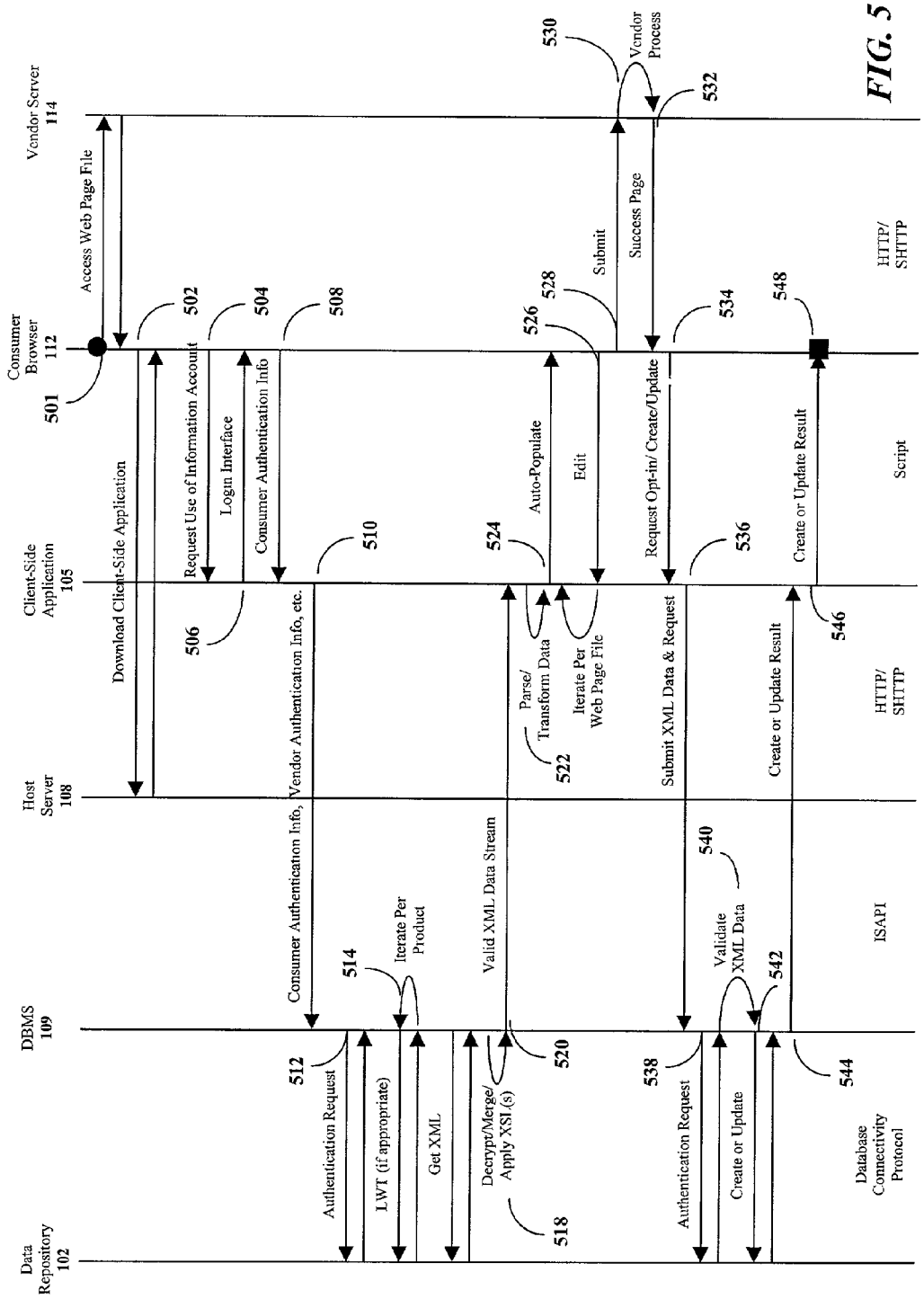
FIG. 5 is a generalized interaction diagram illustrating the interaction between various system components of certain exemplary embodiments as disclosed herein.

FIG. 5. is a generalized interaction diagram illustrating the interaction between various system components of certain exemplary embodiments in connection with consumer-controlled storing, managing and/or distributing information. The exemplary embodiments discussed with reference to FIG. 5 employ a client-side application 105, such as an applet, to manage communication between the client device 104 and the host server 108. Alternative embodiments employing a server-side application 107 instead of the client-side application 105 have been discussed above. Those skilled in the art will appreciate the differences between the interactions involving a client-side application 105 and a server-side application 107.

The generalized interaction diagram begins at step 501, where the consumer operates a browser 112 to retrieve a web page file 116 from the vendor server 114 via the network 106, using a consumer browser. The web page file 116 retrieved from the vendor server 114 may be enabled for interaction with the consumer's information account 110 and may thus include an instruction that causes the browser 112 to download a client-side application from the host server 108. At step 502, the client-side application is downloaded from the host server 108 to the browser 112. At step 504, the consumer interacts with the browser 112 to request use of the information account 110, which in this example has already been created. The web page file 116 may display a selectable icon or other indicia that allows the consumer to request use of the information account 110. Alternatively, the client-side application 105 may provide the interface for requesting use of the information account 110.

Next at step 506, the client-side application 105 displays a login interface to the consumer. The login interface may be displayed, for example, in the open display window of the browser 112, in a pop-up window, or in any other suitable manner. At step 508 the consumer inputs consumer authentication information, which is transferred from the browser to the client-side application 105. Consumer authentication information may comprise, for example, a username, user ID, password, challenge phrase, email address, etc. At step 510, the user authentication information is combined with vendor authentication information and is sent to the DBMS 109. Vendor authentication information may comprise a vendor ID, password, product IP, application ID, and the like. Vendor authentication information may be used to authenticate the vendor and to determine the manner in which consumer information is to be filtered from the information account 110.

After the DBMS 109 receives the authentication information, it submits an authentication request to the data repository 102 at step 512. The authentication request may be a database query to determine if the supplied consumer authentication information and vendor authentication information are consistent with previously stored authentication information. In response to authenticating the consumer and the vendor, the DBMS 109 performs one or more database queries at step 514 to retrieve consumer information elements from the information account 110. Depending on the structure of the information account, the DBMS 109 may retrieve certain products (identified by product ID) from the information account 110, or may retrieve a set of data elements filtered according to a vendor ID or an application ID. If consumer information is retrieved according to products, an iterative lightweight transfer ("LWT") process may be performed in order to get the best set of data elements for each new product ID. Lightweight transfer techniques are well-known in the art and generally involve the use of thin protocols and/or smart proxies that can cache results and perform buffered reads and writes, minimizing the number of network calls.

Once the DBMS 109 has retrieved the relevant consumer information, the consumer information elements may be merged (if appropriate) decrypted (if appropriate) and/or further filtered (if appropriate) at step 518. Then, at step 520, the resulting information elements are transmitted to the client-side application 105, for example in the form of an XML data stream. At step 522, the client-side application 105 parses the received XML data and transforms it into the required format for populating the input fields of the displayed web page file 116. The client-side application 105 then auto-populates the input fields of the displayed web-page file 116 at step 524. The consumer may interact with the browser 112 to edit or modify the auto-populated information at step 526. Because there may be multiple web page files 116 associated with the vendor website, steps 524 and 526 are repeated until all data has been auto-populated and/or edited on every included web page. The client-side application 105 monitors the edit process to determine if the consumer desires to modify and/or supplement any of the consumer information elements.

The consumer may then interact with the browser 112 at step 528 in order to submit the consumer information that has been entered into the displayed web page file(s) 116 to the vendor server 114. The vendor server 114 receives and processes the consumer information elements at step 530. After processing the consumer information, the vendor server 114 preferably transmits a "success page" or other acknowledgement to the consumer's browser 112 at step 532.

Either through a selectable icon or other indicia displayed on the success page or displayed by the client-side application 105, or any other interactive means, the consumer may interact with the browser 112 at step 534 to submit an update request to the DBMS 109. Update is an event whereby the information account 110 is updated to reflect any edits that the consumer may have made to the consumer information at step 526. Thus, a consumer is permitted to update the information account 110 via a vendor's website. As another option, the consumer may elect to update the information account 110 at a later time directly via the host server 108.

At step 536 the client-side application submits the consumer's XML data (possibly only the edited data) and the update request to the DBMS 109. Then at step 538 the update request is submitted to the data repository for authentication. In the authentication process, consumer authentication information, vendor authentication information and, if appropriate, product identification information (which are all included in the update request) are verified. Upon authentication of the update request, the XML data is validated at step 540 and the update is performed at step 542. The DBMS then sends the update result (success or failure) to the client-side application 105 at step 544, which in turn displays the update result to the browser 112 at step 546. The exemplary generalized interaction diagram then ends at step 548.

Figure 6:
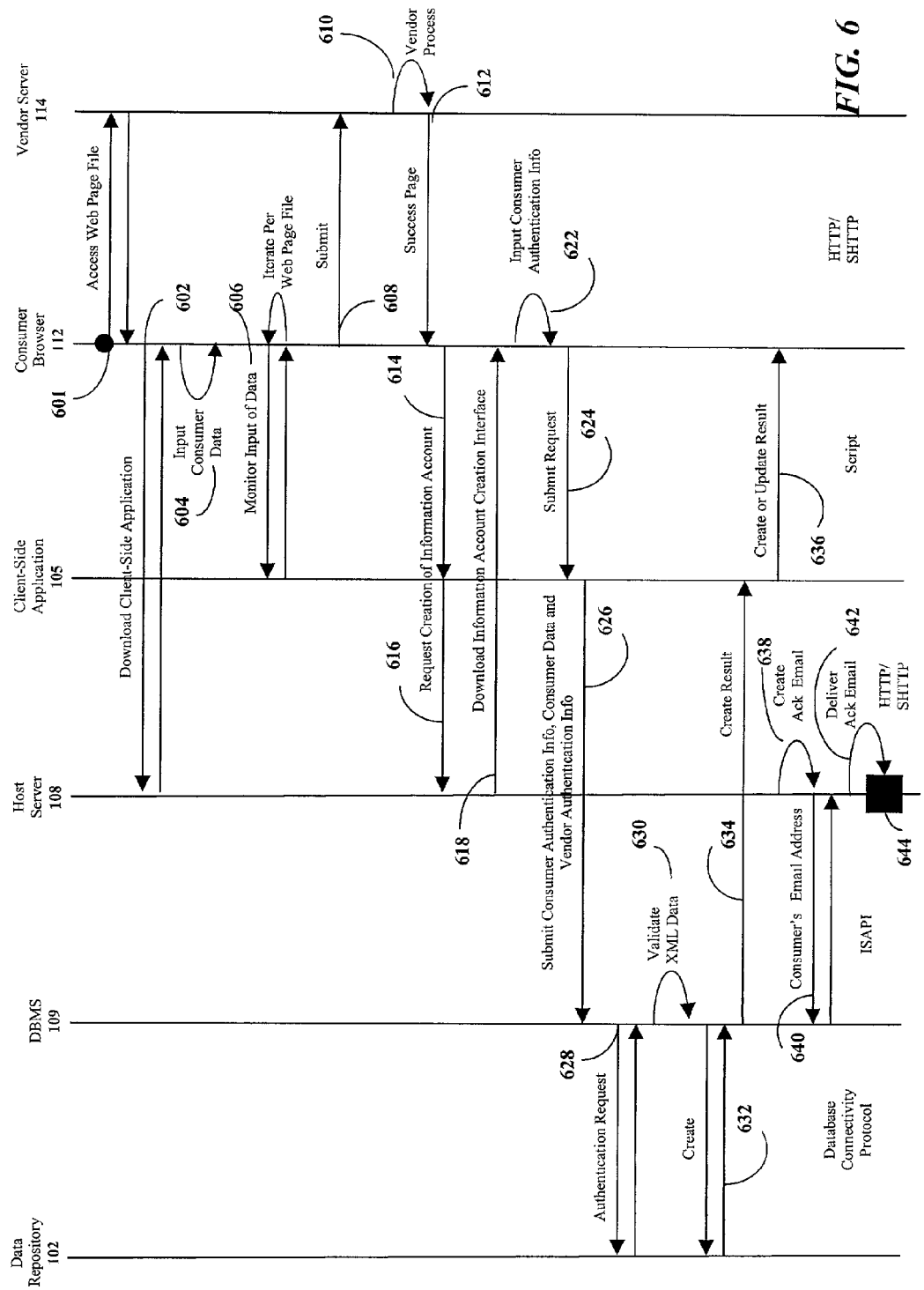
FIG. 6 is a generalized interaction diagram illustrating the interaction between various system components when a new information account is created by a consumer via a vendor's website, in accordance with one or more exemplary embodiments.

FIG. 6 is a generalized interaction diagram illustrating the interaction between main system components when a new information account is created by a consumer via a vendor's website. As mentioned, the consumer may create an information account by visiting a vendor's website that has been configured to allow creation of an information account. The vendor's website may, for example, require the user to manually input consumer information into the input fields of a form. The user may then direct that an information account be created to store the consumer information, so that the consumer will not be required to manually enter the consumer information again on any participating website.

The exemplary embodiments discussed with reference to FIG. 6 employ a client-side application 105, such as an applet, to manage communication between the client device 104 and the host server 108. Alternative embodiments employing a server-side application 107 instead of the client-side application 105 have been discussed above. Those skilled in the art will appreciate the differences between the interactions involving a client-side application 105 and a server-side application 107.

The exemplary interaction diagram of FIG. 6 begins at step 601, where the consumer operates a browser 112 to retrieve a web page file 116 from the vendor server 114 via the network 106, using a consumer browser. The web page file 116 retrieved from the vendor server 114 may be enabled for interaction with the consumer's information account 110 and may thus include an instruction that causes the browser 112 to download a client-side application from the host server 108. At step 602, the client-side application is downloaded from the host server 108 to the browser 112. At step 604, the consumer interacts with the browser 112 to input consumer information into the input fields of the vendor's website. The client-side application 105 monitors the input of consumer information at step 606.

Next at step 608 the consumer interacts with the browser 112 in order to submit the consumer information to the vendor server 114. The vendor server 114 receives and processes the consumer information elements at step 610. After processing the consumer information, the vendor server 114 transmits a "success page" or other acknowledgement to the consumer's browser 112 at step 612. Either through a selectable icon or other indicia displayed on the success page or displayed by the client-side application 105, the consumer may interact with the browser 112 at step 614 to submit a request for creation of an information account 110 to the DBMS 109. Thus, the consumer may be permitted to create an information account 110 via a vendor's website. As another option, the consumer may elect to create an information account 110 at a later time directly via the host server 108.

At step 616 the client-side application submits the consumer's XML data and the create request to the host server 108. Then at step 618 the host server 108 transmits an information account creation interface to the browser 112. The consumer inputs consumer authentication information via the information account creation interface at step 622 and the browser 112 passes the create request (which may include the consumer authentication information, the vendor authentication information, etc.) to the client-side application 105 at step 624.

At step 626, the create request is combined with the consumer's XML data and is sent to the DBMS 109. In response to receiving the authentication information, the DBMS 109 submits an authentication request to the data repository 102 at step 628. The authentication request may be a database query to determine if the supplied consumer authentication information and vendor authentication information are consistent with previously stored authentication information. In response to authenticating the consumer and the vendor, the DBMS 109 validates the consumer's XML data at step 630 and creates a new information account 110 at step 632.

Once the information account has been created, the DBMS 109 sends the create result (success or failure) to the client-side application 105 at step 634, which in turn displays the create result to the browser 112 at step 636. At step 638, the host server 108 creates an acknowledgment email to be sent to the consumer's email account. At step 640, the host server requests and receives the consumer's email address from the DBMS 109. At step 642 the consumer's acknowledgment email is delivered to the consumer. The exemplary generalized interaction diagram then ends at step 644.

Figure 7:
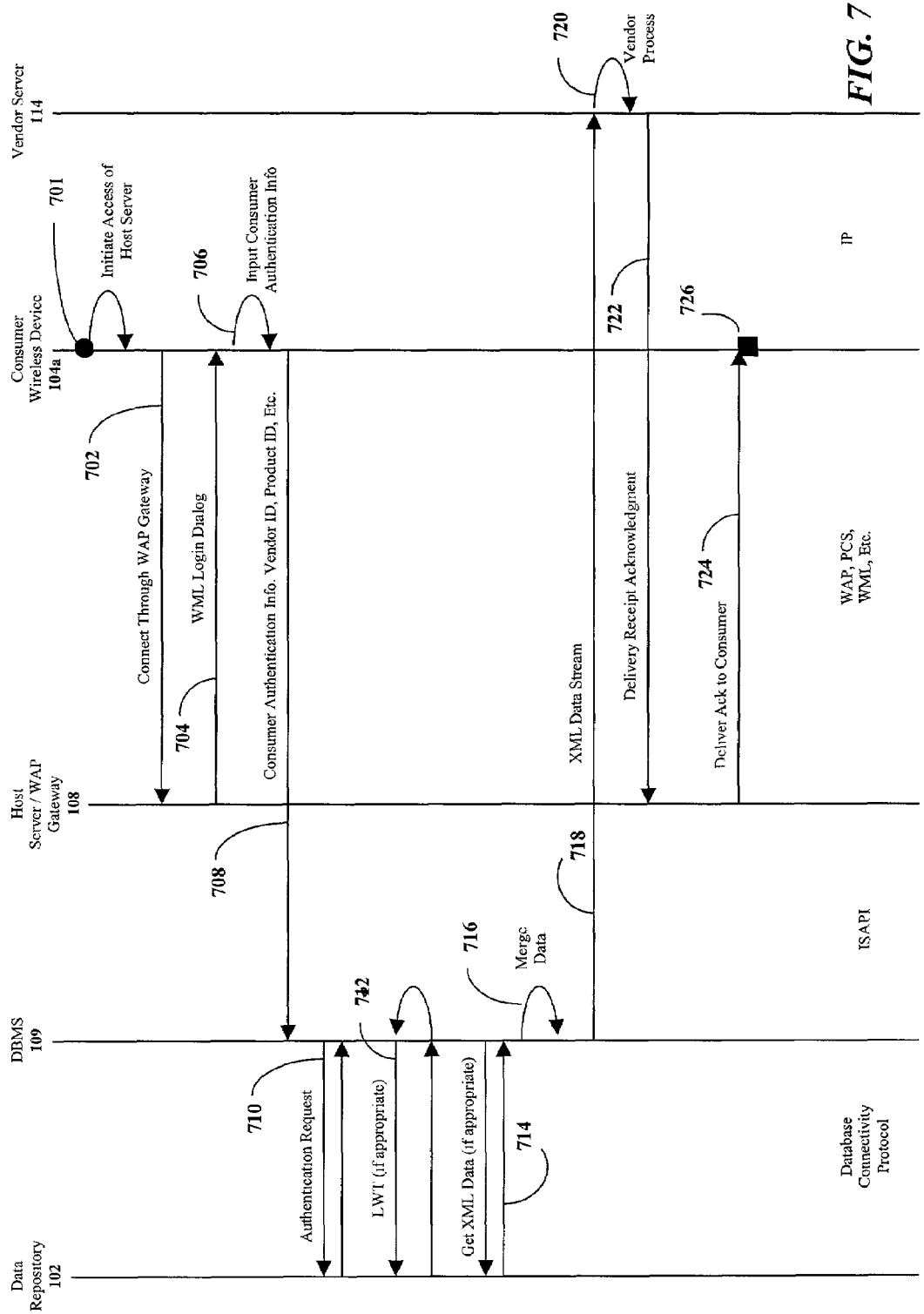
FIG. 7 is a generalized interaction diagram illustrating the interaction between various system components in an exemplary wireless environment.

FIG. 7 is a generalized interaction diagram illustrating the interaction between various system components in an exemplary wireless environment suitable for implementation of systems or methods for consumer-controlled storage, management and/or distribution of information. An exemplary wireless environment is suited for wireless devices such as digital or cellular telephones, personal digital assistants ("PDAs"), portable computers, and the like. Such wireless devices generally include a display device and an input device (keypad, touch screen, microphone, etc.), each of limited size and utility. The difficulty of inputting detailed information and commands into a wireless device makes it desirable to provide a system whereby the backend DBMS 109 is able to communicate directly with various remote web servers, thus eliminating a significant amount of user-interaction with the wireless device.

The generalized interaction diagram of FIG. 7 begins at step 701, where the consumer operates a wireless client device 104a to access the host server 108. Accessing the host server 108 may involve, for example, calling a dedicated access number using a mobile telephone device or two-way pager. At step 702, the wireless client device 104a accesses the host server 108 via a wireless application ("WAP") gateway. At step 704, the host server 108 returns a login interface to the wireless client device 104a. At step 706 the consumer inputs consumer authentication information using an input device of the wireless client device 104a. Consumer authentication information may comprise, for example, a username, user ID, password, challenge phrase, email address, etc.

At step 708, the user authentication information is combined with vendor authentication and is sent to the DBMS 109. Vendor authentication information may comprise a vendor ID, password, product IP, application ID, and the like. Vendor authentication information may be used to authenticate the vendor and to determine the manner in which consumer information is to be filtered from the information account 110. After the DBMS 109 receives the authentication information, it submits an authentication request to the data repository 102 at step 710. In response to authenticating the consumer and the vendor, the DBMS 109 performs one or more database queries to retrieve consumer information elements from the information account 110.

Depending on the structure of the information account, the DBMS 109 may retrieve certain products (identified by product ID) from the information account 110, or may retrieve a set of data elements filtered according to a vendor ID or an application ID. If consumer information is retrieved according to products, an iterative lightweight transfer ("LWT") process may be performed at step 712 in order to get the best set of data elements for each new product ID. Otherwise, the consumer information elements are retrieved from the data repository 102 using appropriate filters at step 714.

Once the DBMS 109 has retrieved the relevant consumer information, the consumer information elements may be merged (if appropriate), decrypted (if appropriate) and/or further filtered (if appropriate) at step 716. Then, at step 718, the resulting information elements are transmitted to the vendor server 114, for example, in the form of an XML data stream. The vendor server 114 receives and processes the consumer information elements at step 720. After processing the consumer information, the vendor server 114 transmits a delivery receipt acknowledgment to the host server 108 at step 722. The host server 108 may then pass an acknowledgment (success or failure) to the consumer (e.g., to the wireless client device 104a or to another client device 104) at step 724. The exemplary generalized interaction diagram then ends at step 726.

Figure 8:
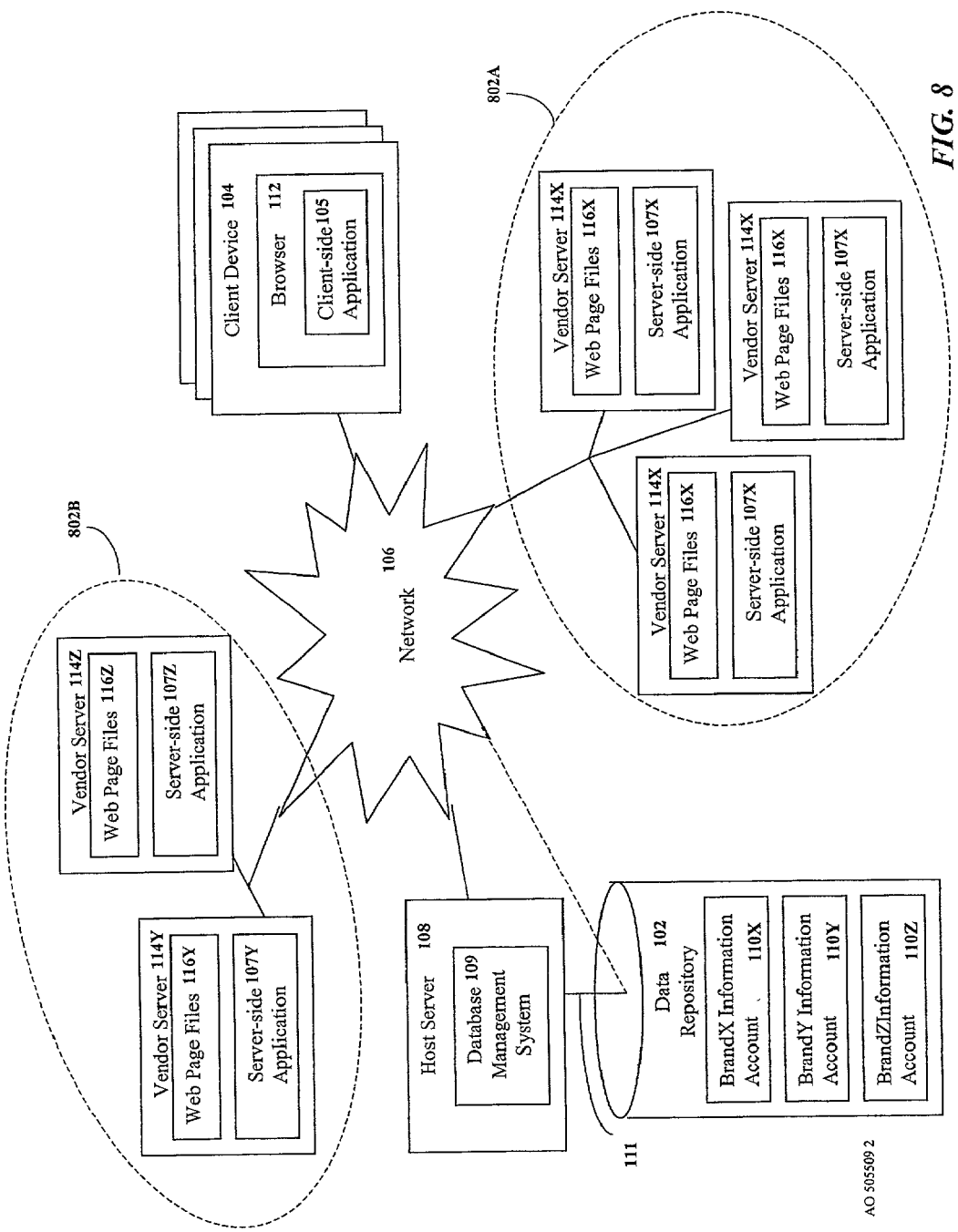
FIG. 8 is a high-level block diagram illustrating logical grouping of vendor servers into exchanges in accordance with one or more exemplary embodiments as disclosed herein.

As shown in FIG. 8, information accounts 110 may be used in the context of one or more exchanges 802A&B. In this context, an exchange 802A&B may comprises a group of entities (e.g., vendor servers 114) that are authorized and configured to accept consumer information from a particular information account 110 at the request of the consumer. An information account 110 may, in some embodiments, be used to retrieve information for use in commerce with any vendor that is a member of the exchange 802A&B. An information account 110 may be accepted in one or more exchanges 802A&B according to various rules and relationships, as illustrated by the examples set forth herein. A consumer may also have several different information accounts 110, each valid for use in one or more exchanges.

An exchange may comprise a logical grouping of servers or other network devices, and those skilled in the art will appreciate that there are a variety of suitable methods for implementing logical groupings of network devices on a distributed network. For example, an exchange identifier may be used to identify an exchange and may be associated with each network device that is a member of that exchange. In such an embodiment, look-up table of exchange identifiers may be maintained at the host server 108, within the central data repository 102 or at another suitable location and may be used to authenticate an exchange identifier used in connection with a request for access to an information account 110.

Exchanges 802A&B may be implemented, for example, through inflow and/or outflow constraints. An inflow constraint may, for example, dictate that only information accounts 110 associated with specific other exchanges will be accepted within an exchange or that no information accounts 110 associated with other exchanges will be accepted. An outflow constraint may dictate that information accounts 110 associated with an exchange may be used within that exchange and within no other exchanges (i.e., a private exchange), or within only selected other exchanges. Various business situations and partnerships may drive the implementation of inflow and outflow constraints.

In various embodiments, an information account 110 may be branded so as to be associated with a particular vendor or other entity, product or service. By way of example only, if a consumer creates an information account 110 via a website maintained on behalf of a particular vendor, e.g., "Vendor X," the information account 110 may be branded as a "BrandX" information account 110X. A BrandX information account 110X may be stored in the central data repository in association with a BrandX identifier. BrandX logos or indicia may be displayed to the consumer when the consumer accesses the BrandX information account 110X. Thus, although Vendor X "sponsors" the BrandX information account 110X, the central data repository 102 that stores the BrandX information account 110X may be maintained by another entity.

An exchange 802A&B may be configured to accept one or more differently branded information accounts 110. This concept is similar to automated teller machine (ATM) networks, in which a customer of one bank may use his ATM card (e.g., debit or credit card) to conduct transactions at the ATM of another bank. Typically, an ATM card includes a number of logos (also referred to as "bugs") that indicate the financial networks that will accept the ATM card. ATMs also display logos identifying the financial networks to which they are connected. Thus, a bank customer may have a Wachovia® ATM card that is accepted in all Honor and PLUS network ATMs. Similarly, the various vendor servers 114 that make up a particular exchange may include logos or other indicia indicating the brands of information accounts 110 that will be accepted.

Figure 9:
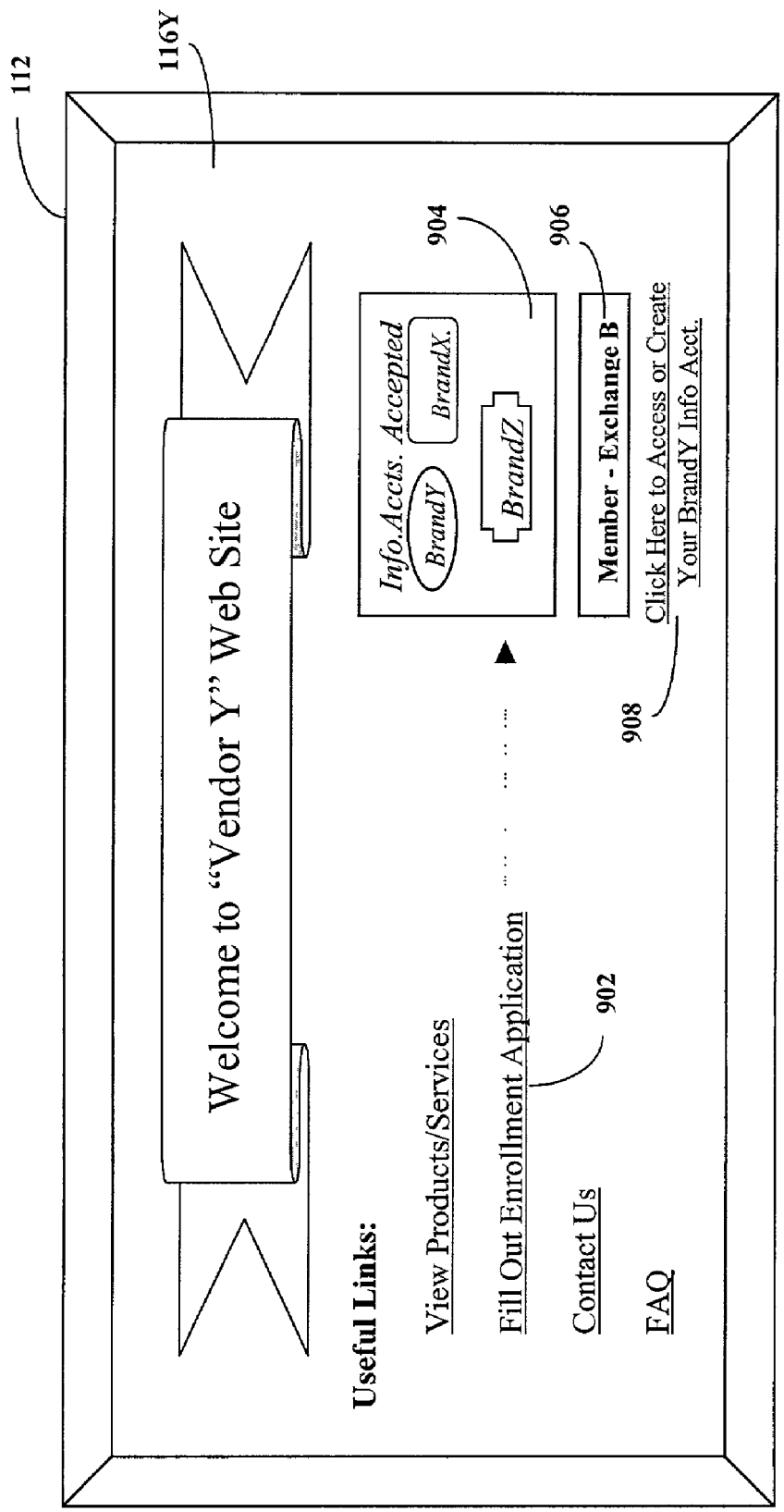
FIG. 9 is an illustration of a web page displaying logos that identify a branded information account and exchange membership in accordance with one or more exemplary embodiments as disclosed herein.

With reference to FIG. 8 and FIG. 9, a consumer interacting with a browser 112 of a client device 104 may be presented with a web page file 116Y by a vendor server 114Y maintained by Vendor Y. The displayed web page file 116Y may display an enrollment application link 902 that, when selected, will cause an enrollment application to be presented to the consumer. An enrollment application may be a form or other interface that prompts the consumer to input selected information. The website of Vendor Y may be configured, as described above, for interaction with the central data repository 102 via the host server 108. Furthermore, the vendor server 114Y may be a member of "Exchange B" 802B that also includes vendor server Z 114Z. For the sake of example only, it may be assumed that the inflow constraints of Exchange B 802B allow any member vendor server (114Y&Z) to accept BrandY information accounts 110Y, BrandZ information accounts 110Z and BrandX information accounts 110X.

The displayed web page file 116Y may thus display one or more brand logos 904 indicating the accepted brands of information accounts. The displayed web page file 116Y may also display one or more exchange logos 906 indicating the exchanges of which the vendor server 114Y is a member. In addition, the displayed web page file 116Y may display an access/create link 908 for allowing a consumer to access or create a BrandY information account 110Y. The displayed web page file 116Y of FIG. 9 is shown by way of example only and that may other arrangements are possible. In perhaps a more practical example, the brand logos 904, the exchange logos 906 and the access/create link 908 might be presented to the consumer only if the consumer selects the enrollment application link 902. Other types of user interfaces may also be used.

When used in the context of a private exchange (e.g., an exchange that does not accept foreign information accounts 110) an information account may take the form of a "private" branded information account 110. As an example, if Vendor X establishes a private Exchange A 802A that offers a variety of financial services, a BrandX information account 110X may be established for consumers who participate in the private exchange. The BrandX information account 110X may be configured to store information that is relevant to the financial services offered by Vendor X. If appropriate outflow constraints are established, the BrandX information account 110X may be accepted only within private Exchange A 802A. Again, Vendor X may facilitate or otherwise sponsor the creation of the BrandX information account 110X while another entity may server as the custodian of the data repository 102 for storing the BrandX information account 110X and provide the underlying information technology.

If private Exchange A 802A is not subject to outflow constraints, a BrandX information account 110X may also be accessed at websites hosted by or on behalf of other vendors, such as Vendor Y and/or Vendor Z. Consequently, an on-line form associated with Vendor Y web page files 116Y or Vendor Z web page files 116Z may automatically be populated based on information elements originating from the BrandX information account 110X. Similarly, if Exchange A 802A is subject to appropriate inflow constraints, a BrandY information account 110Y and a BrandZ information account 110Z may also be used at any website hosted by a vendor server 114X that is a member of the Exchange A 802A. In general, any number of vendors or other entities may participate in an exchange.

Various licensing arrangements and revenue sharing agreements may be established between the custodian of the data repository 102 and the vendors that configure their vendor servers 114 for interaction with information accounts 110. In particular, the custodian may choose to implement revenue sharing models in order to provide vendors with an incentive to promote and facilitate the creation and use of information accounts 110. The custodian may earn revenues in exchange for the service of providing access to information accounts 110 for completion of transactions. For example, the custodian may be paid a per transaction commission by the requesting exchange or vendor each time an information account 110 is used by a consumer to quickly fill out a form or other document for completing a transaction with a vendor. As another example, the custodian of the data repository 102 may receive revenue from the requesting exchange or vendor based on milestone transaction numbers. For example, the custodian may be paid a negotiated dollar amount for a negotiated number of transactions (e.g., $100 for every 500 transactions completed using an information account).

The more information accounts 110 that are in existence, the more transactions that are likely to occur in commerce. Accordingly, the custodian of the data repository 102 may choose to implement various revenue sharing models in order to financially encourage vendors and other entities to promote and/or sponsor information accounts 110. As an example, a revenue sharing model may specify that a lifetime revenue stream be paid to the originating vendor or entity that is credited with facilitating the creation of an information account 110. A lifetime revenue stream may be effective for the life of the information account 110 and may take the form of a credit issued to the originating vendor or entity each time that information account 110 is used to complete a transaction. A credit may amount to a percentage (anywhere from 0% to 100%) of the revenue earned by the custodian of the data repository 102 in connection with the transaction, or an otherwise arranged fee. Revenue sharing models may also specify that credits be paid by the custodian of the data repository 102 to a transacting vendor or entity that accepts consumer information elements from an information account 110 in order to complete a transaction.

In the context of exchanges and branded information accounts, the amounts credited to originating entities and transacting entities may vary depending on the particular exchange and/or which brand of branded information account was used in order to complete a transaction. For example, referring back to FIG. 9, the custodian of the central data repository 102 may grant larger credits to a transacting vendor (Vendor X) when a BrandY information account 110Y (that is, an information account from another exchange) is used to complete a transaction through the vendor server 114X, as opposed to when a BrandX information account 110X (that is, an information account from the same exchange) is used to complete a transaction through the vendor server. As mentioned, any number of factors or business relationships may affect the revenue sharing models adopted by the custodian of the central data repository 102. As will be appreciated by those of skill in the art, different and/or multiple revenue sharing models may be applied to different exchanges or associated with differently branded information accounts. Members of an exchange may also choose to establish their own additional revenue sharing models, for example, in an attempt to maximize the acceptance of a branded information account.

Revenue sharing models may further include credits paid to OEMs, consultants, software providers and/or any other party who facilitates the creation and/or construction of an exchange, introduces information accounts 110 to an exchange, or otherwise assists the custodian of the central data repository 102 in increasing its revenue base.

Figure 10:
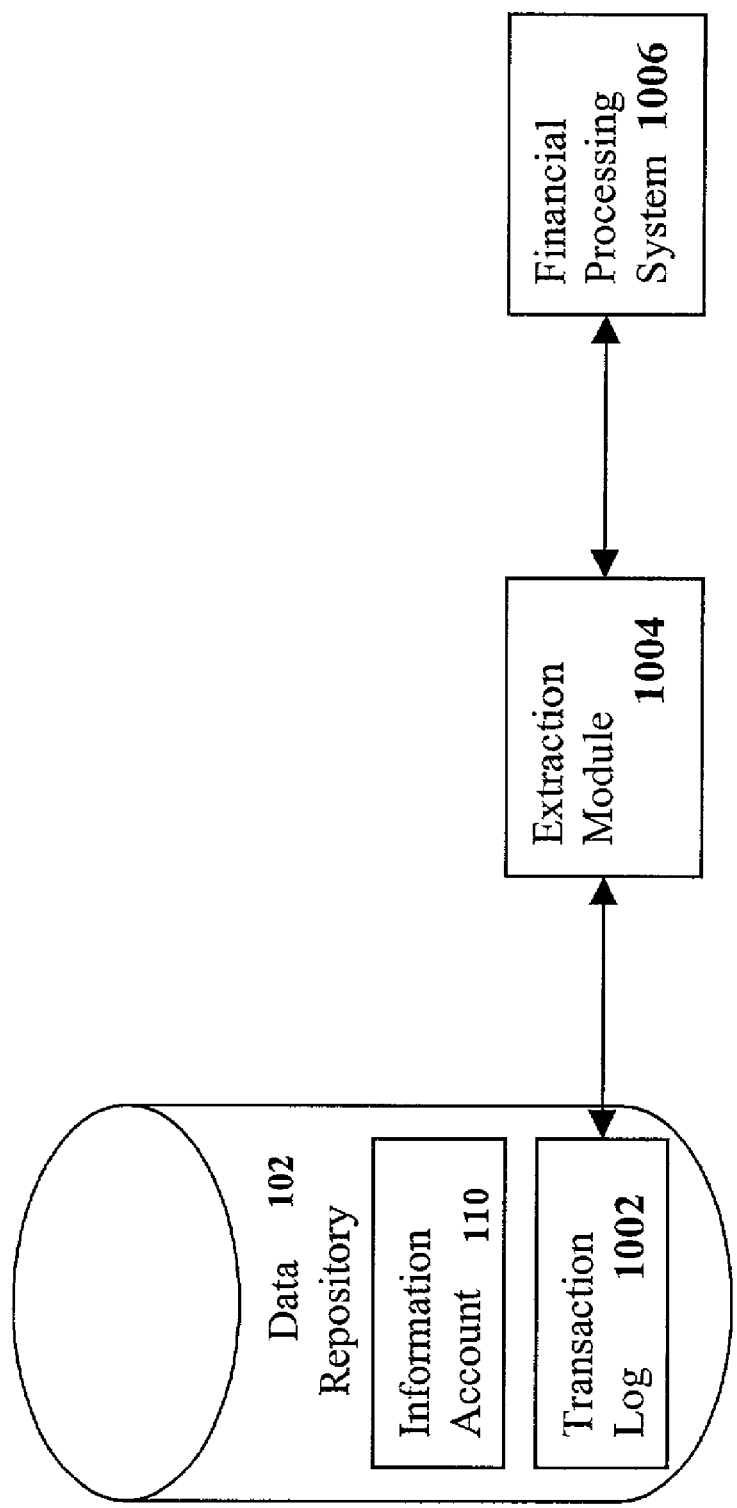
FIG. 10 is an abstract illustration of exemplary system components for implementing revenue sharing models in accordance with certain exemplary embodiments.

FIG. 10 is an abstract illustration of system components for implementing revenue sharing models in accordance with certain exemplary embodiments as disclosed herein. As shown, the central data repository 102 may store one or more transaction logs 1002 containing information relevant to any transaction that involved an information account 110. The transaction log 1002 may identify, for example, the date, time and nature of the transaction, the originating entity, the transacting entity, whether the information account 110 was branded, etc. Many alternatives for storing and identifying transaction information are possible in the context of the illustrated embodiment. For example, each information account 110 may include or have associated therewith a unique transaction log 1002. Alternatively, a transaction log 1002 may be used to store transaction information associated with multiple information accounts 110.

An extraction module 1004 may be used to facilitate the extraction of transaction information from a transaction log 1002. The extraction module 1004 may be executed by the host server 108 or by another network device that is in communication with the host server 108 or the central data repository 102. The extraction module 1004 may be employed to extract selected transaction information from the transaction log 1002 and to translate or transform the extracted transaction information into a format that can be interpreted by a financial processing system 1006. Thus, in certain embodiments, the extraction module 1004 may be configured to extract transaction data elements from a tagged data stream representing or associated with an information account 110. SOAP and/or other well-known protocols may be used by the extraction module 1004 to interface between the transaction log 1002 and the financial processing system 1006. The financial processing system 1006 may comprise any system for processing transaction information and revenue sharing models in order to ensure that the appropriate party is billed in connection with a transaction involving an information account and that revenues are shared with the appropriate parties. By way of example only, the financial processing system may be a custom software module or an off-the-shelf software package, such as the well-known "Oracle Financials" package.

Those skilled in the art will appreciate that the system components and arrangement thereof shown in FIG. 10 are by way of example only. Various other methods for recording and processing transaction information may be used in accordance with the concepts and principals discussed or suggested herein.

In connection with the creation of an information account 110, a consumer may be provided with consumer authentication information, which may include, for example, a username, password, user ID, biometric, challenge word, phrase or response, etc. This consumer authentication information may be stored in the consumer's information account 110, along with other authentication-related information such as, for example, email address, access attempts, last attempt date/time, challenge query, ticket parameters, vendor credited with origination of the information account, etc. In certain embodiments as disclosed herein, a single sign-on mechanism (also referred to herein as a single sign-on feature) may be provided to allow a consumer to "sign-on" (i.e., to provide consumer authentication information as may be required) for authentication to securely access an information account 110 at a first website. Since a consumer's information account 110 may be accessible from more than one website, the authentication status may be handled in such a way so as to "follow" the consumer as the consumer accesses subsequent websites. At such subsequent websites, a consumer who has activated the single sign-on mechanism need not re-enter authentication information, assuming certain conditions are present.

A preferred single sign-on mechanism can be implemented, in certain embodiments, without requiring a manual download or installation of any program modules on the consumer's client device 104. Nor does the single sign-on mechanism, at least in a preferred embodiment, require "add-ons", "cookies" or other special configurations for a web browser, although such features may optionally be utilized in connection with or in addition to a single sign-on mechanism as disclosed herein. A preferred single sign-on mechanism is managed at the client device 104 via one or more client-side applications 105 that are loaded into the browser 112 along with web page files 116 that comprise a consumer information account-enabled website. Applets (e.g., JAVA applets) are particularly well-suited for use as client-side applications 105 in this context, due to their platform independent nature. In an exemplary embodiment of the single sign-on mechanism, a client-side application 105 (e.g., applet) may communicate with the host server 108 to determine whether the user has already been authenticated, and if so, to cause the log-in interface to be by-passed. Re-authentication may thereby be performed automatically by way of the client-side application 105.

Figure 11:
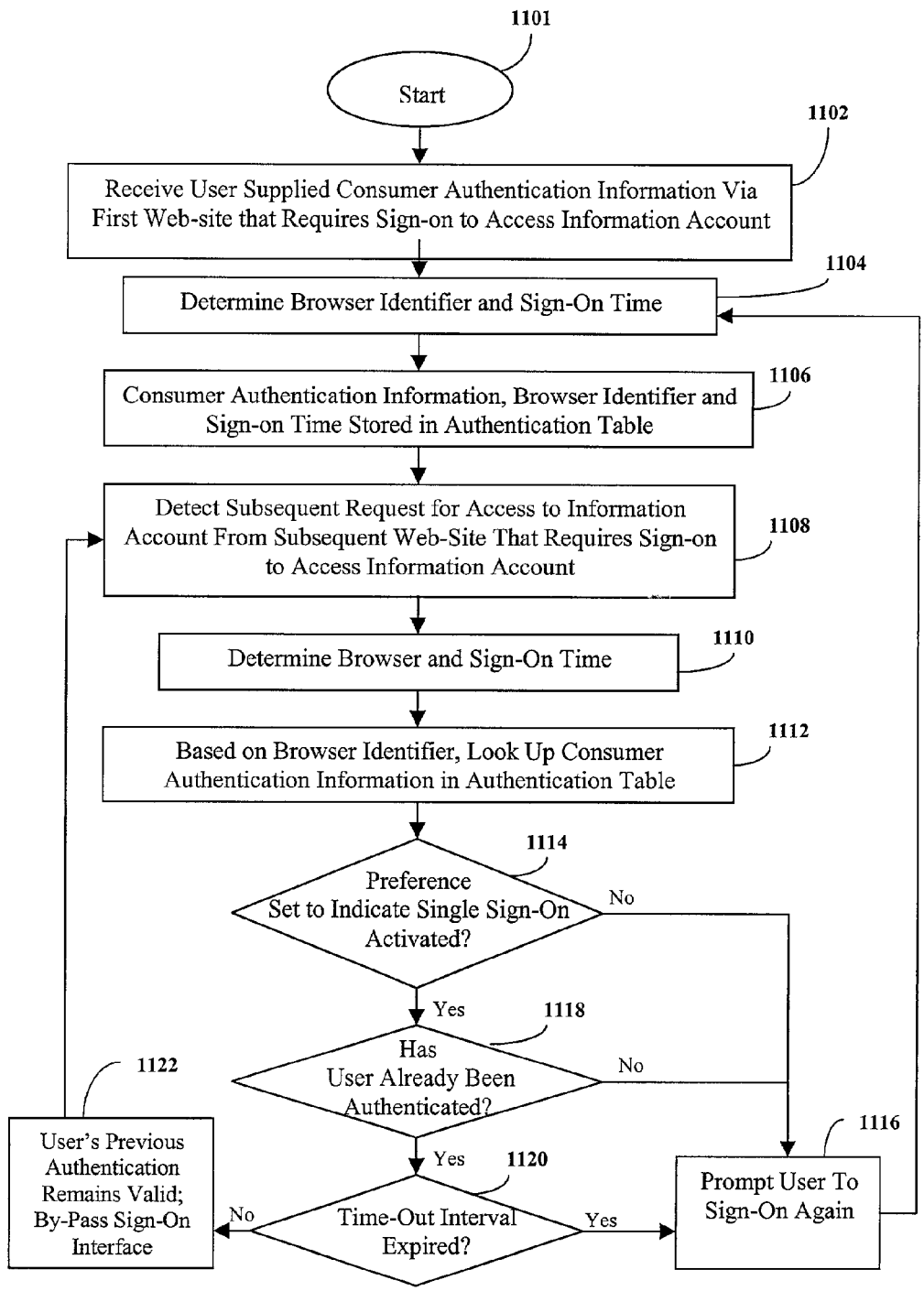
FIG. 11 is a flow chart illustrating an exemplary single sign-on method in accordance with an exemplary embodiment of the present invention.

FIG. 11 is a flow chart illustrating an exemplary single sign-on method. The method begins at step 1101, whereupon a consumer using a client device 104 downloads an information account-enabled web page file 116 which is displayed by browser 112. The web page file 116 may include an instruction (e.g., a "call") that causes the browser 112 to download and execute one or more client-side applications 105, which may be used to manage, among other things, the general request/response process involved in accessing and retrieving information from an information account 110 for the client device 104. Client-side application(s) 105 may further be used to implement and manage functions of the single sign-on feature at the client device 104. Those skilled in the art will appreciate that management of single sign-on functions may be performed by the same or different client-side application(s) 105 that manage the general request/response process.

After the client device 104 has downloaded the information account-enabled web page file 116, the user may activate an access/create link 908 of the consumer information account-enabled displayed web page file 116 and, assuming that the single sign-on feature is not activated, may subsequently supply consumer authentication information (e.g., username/password, etc.) via a sign-on interface in order to request access to an information account 110. At step 1102, the client-side application 105 responsible for authentication receives the consumer authentication information supplied by the user. Then, at step 1104 the client-side application 105 determines a browser identifier that uniquely identifies the browser from which the sign-on request was initiated and the sign-on time (i.e., the time the sign-on request was initiated.) The browser identifier may comprise any unique identification code, such as a product serial number (relating to hardware or software), a dynamically generated alphanumeric string, etc. The sign-on time may be determined, for example, by interacting with a clock function executed by the client device 104. It is expected that the client device 104 (a personal computer, for example, has a system clock from which the current time may be read. However, it is also possible that to obtain the current time from a remote site across the network 106. The sign-on time may be stored as wither an absolute time value, or else as a relative time value with respect to a known reference time.

Those skilled in the art will appreciate that any equipment identifier that uniquely identifies the client device 104 may be substituted for the browser identifier. For example, mobile client devices 104a, such as network-enabled telephones, PDA, portable computers and the like may be assigned unique equipment identifiers, which may be static or dynamic. A client-side application 105 may thus be configured to determine any unique equipment identifier and to transmit that unique equipment identifier to the host server 108. Furthermore, an equipment identifier may be generated or determined at the network device 104 or may be received from another source, such as the host server 108, a certificate authority or some other authentication entity. Accordingly, any reference herein to a browser identifier is intended merely to provide an example of certain embodiments of the present invention and is not intended to limit the scope thereof.

The order in which the client-side application 105 receives or determines the consumer authentication information, the browser identifier and the sign-on time may vary in different embodiments. For example, in some embodiments the browser identifier may always be determined first and used to determine if the single sign-on feature was previously activated, while in other embodiments a different sequence may be employed. Accordingly, the sequence of exemplary steps 1102–1104 is not intended to be limiting.

At step 1106 the consumer authentication information, the browser identifier, the sign-on time and any other information associated with the sign-on process are stored in an authentication table 113, which is preferably maintained at the host server 108. Accordingly, the client-side application 105 may transmit the consumer authentication information, the browser identifier, the sign-on time, etc. to the host server 108. The host server 108 may utilize the database management system 109 for interacting with the authentication table 113. The authentication table 113 may alternatively be stored in another location accessible by the host server 108, such as the data repository 102, or another network server. Once authenticated, the consumer can access the information account 110 via the vendor web-site 114 using the client device 104.

In continuing to operate the browser 112 to access web page files 116 via the network 106, the user may access a subsequent web-site that requires sign-on and authentication to access the consumer information account 110. Like before, upon accessing a new vendor web-site 114, the client device 104 may download an information account-enabled web-page file 116 that is displayed by the browser 112, and the web-page file 116 may include an instruction (e.g., a "call") that causes the browser 112 to download and execute one or more client-side applications 105. The client-side application 105 responsible for authentication detects a subsequent request for access to the consumer information account 110 via the subsequent web-site at step 1108. As an example, the subsequent request for access to the consumer information account 110 may occur when the user activates an access/create link 908 of the subsequent web-site. When the request for access to the consumer information account 110 is detected, the client-side application 105 determines a browser identifier at step 1110. At step 1112, the browser identifier (as determined at step 1110) may be used to look up the associated consumer authentication information and previous sign-on time stored in the authentication table 113. In particular, the client-side application 105 may transmit the browser identifier (as determined at step 1110) to the database management system 109 at the host server 108, which may access the authentication table 113 to determine the username, password, previous sign-on time, etc. associated with the browser identifier, if any.

Assuming that consumer authentication information was determined to be associated with the browser identifier, the method next moves to step 1114, where a determination is made as to whether the single sign-on feature is activated. In certain exemplary embodiments, the authentication table 113 may also associate certain preferences with the browser identifier, consumer authentication information, sign-on time, etc. A preference may indicate, for example, whether the user has opted to activate or deactivate the single sign-on feature. By way of example, a dialog box or other interface may be presented to the user during the initial sign-on requesting input from the user as to whether the single sign-on feature should be activated. If single sign-on activation is optional, the database management system 109 (or other responsible network component) may be configured to access the authentication table 113 to determine whether a preference associated with the browser identifier (as determined at step 1110) indicates that the user had previously activated the single sign-on mechanism. Once activated, the single sign-on feature may be automatically deactivated upon the occurrence of certain terminating events, such as the end of a browser session, a manual sign-off (logout) by the user, the expiration of a time-out interval (see step 1120 below), etc. The user may also be provided with the option to manually deactivate the single sign-on feature.

If the single sign-feature has not been activated, the method advances to step 1116, whereupon the user is prompted to sign-on again for further access to the information account 110. The user may optionally be prompted with a choice to activate the single sign-on feature during the sign-on process. After the user signs-on via the subsequent web-site, the method returns to step 1104 where the browser identifier and sign-on time are again determined. The method is then repeated from step 1104, as described above.

On the other hand, if the single sign-on feature has been activated, the method advances from step 1114 to step 1118, whereupon the authentication table 113 is consulted to look up the consumer authentication information and determine if and when the user had been previously authenticated by, for example, determining whether the current browser identifier (as determined at step 1110) matches the most recently stored browser identifier in the authentication table 113. If the browser identifiers do not match, or other specified criteria are not met, the user is considered to not have been previously authenticated and the method proceeds to step 1116 where the user is prompted to sign-on again for further access to the information account 110. If, however, the browser identifiers match, or other specified criteria are met, the consumer is considered to have been previously authenticated and the method advances to step 1120, where it is determined whether an authentication time-out interval has expired.

An authentication time-out interval may be defined, according to one example, as the maximum permitted duration of time between the occurrence of an event and a subsequent request for access to the information account 110. The event defining the starting point from which the time-out interval will be calculated may be the first manual sign-on, the most previous sign-on (manual or automatic) or other non-sign-on related events. Those skilled in the art will appreciate that the duration of the time-out interval may be specified globally or otherwise by a system administrator or other entity charged with maintaining the data repository 102. When the subsequent request for access to the information account is initiated by the user, the elapsed time between the current time and the occurrence of the starting point event (e.g., the previous sign-on time) may be determined. If that elapsed time is greater than the duration of the time-out interval, the time-out interval may be considered to have expired. In the preferred embodiment, the time-out interval may be used to enhance the security of the single sign-on mechanism, forcing the user to sign-on again if too much time has elapsed between consecutive sign-on attempts, for example.

If it is determined at step 1120 that the time-out interval has expired, the method proceeds to step 1116 where the user is prompted to sign-on again for further access to the information account 110. From step 1116 the method returns to step 1104 and is repeated as previously described. However, if it is determined at step 1120 that the time-out interval has not expired, the method advances to step 1122. At step 1122, the vendor server 114 that hosts the subsequent web-site is alerted that the user's previous authentication status remains valid, thus causing the vendor server 114 to by-pass any sign-on interface associated with the information account 110. As an example, the client-side application 105 may receive a message from the host server 108 indicating that the user's previous authentication status remains valid and may pass that message to the vendor server 108 or may generate an instruction that causes the vendor server 108 to by-pass any sign-on interface associated with the information account 110. After an automatic sign-on at step 1122, the method returns to step 1108 to await detection of another request for access to the consumer information account 110 via a subsequent web-site that requires sign-on to access the information account 110.

Although the single sign-on feature has, in certain instances, been described as being implemented by way of communications between the host server 108 and a client device 104 (e.g., via a client-side application 105), those skilled in the art will appreciate that single sign-on feature may alternately be implemented by way of communications between the host server 108 and a vendor server 114 that hosts a web-site configured to provide access to the central data repository 102 upon authentication of the consumer. Analogously to execution of the client-side applications 105 by the client device 104, the vendor server 114 may execute one or more server-side applications 107 for managing communications with the host server 108 and conducting authentication thereby. Accordingly, one or more server-side applications 107 may be configured to perform the functions of the single sign-on feature, or functions similar thereto, that are described above with respect to one or more client-side applications 105. In implementing the single sign-on feature through use of server-side applications 107, vendor authentication information and/or an equipment identifier or APPID associated with the vendor server 114 may be transmitted to the host server 108, as appropriate. The vendor server may also communicate with the client device to receive consumer authentication information and/or a browser identifier, if needed.

As mentioned, once the user is authenticated to access the information account 110, selected consumer information elements may be filtered from the information account 110 and integrated into a vendor's business process on behalf of the user. As an example, the selected consumer information elements may include authentication information (usernames, passwords, biometrics, etc.) that is needed to access secure areas of vendor web-sites. Thus, after the user has successfully signed-on to the information account 110, subsequent authentications of the user for access to the information account 110 may be handled automatically by the single sign-on feature and other consumer authentication information may be auto-populated into sign-on interfaces of secure web-sites on behalf of the consumer. The present invention therefore reduces the consumer's need to repeatedly supply the consumer authentication information for accessing the information account 110 and can virtually eliminate the consumer's need to supply other authentication information for accessing other secure web-sites.

From a reading of the description above pertaining to various exemplary embodiments, many other modifications, features, embodiments and operating environments of the present invention will become evident to those of skill in the art. The features and aspects of the present invention have been described or depicted by way of example only and are therefore not intended to be interpreted as required or essential elements of the invention. It should be understood, therefore, that the foregoing relates only to certain exemplary embodiments of the invention, and that numerous changes and additions may be made thereto without departing from the spirit and scope of the invention as defined by any appended claims.

We claim:

1. A computer-implemented method for providing access to consumer information comprising:

storing an information account in a central data repository that is accessible via a distributed computer network, the information account containing consumer information elements that are changed by the consumer;

associating consumer authentication information with the information account using a server such that access to the information account by the consumer is conditioned upon receipt and verification of the consumer authentication information by the server;

further associating a temporary authorization with the information account using an authentication module running on the server, the temporary authorization having consumer-defined attributes that define access privileges that will be granted to a person who presents the temporary authorization along with a request for access to the information account;

receiving the temporary authorization from the distributed computer network;

comparing the temporary authorization to data in an authentication table associated with the information account using the authentication module in order to determine at least one of: whether the temporary authorization is being used by an authorized party who is not the consumer, whether the temporary authorization has expired, and what level of access to the information account is associated with the temporary authorization; and granting a level of access to the information account by the authentication module based on the temporary authorization if the temporary authorization is found valid based on the comparing step.

2. A computer readable medium having stored thereon computer executable instructions for performing the method of claim 1.

3. The method of claim 1, wherein the consumer-defined attributes comprise at least one of the access privileges relating to: a number of times that the temporary authorization may be used to access the information account, a period of validity associated with the temporary authorization, a type of the consumer information elements that can be accessed, and a specification of read, write and/or modify privileges.

4. The method of claim 1, wherein the consumer-defined attributes include a filter identifier that identifies a filter to be used to ensure that only authorized data is filtered for release to the party who presents the temporary authorization.

5. The method of claim 1, further comprising the step of transmitting the temporary authorization to the consumer; and wherein the consumer presents the temporary authorization to a third-party.

6. The method of claim 1, further comprising the step of transmitting the temporary authorization to a designated third-party on behalf of the consumer.

7. A computer readable medium having stored thereon computer executable instructions for performing the method of claim 6.

8. The method of claim 6, wherein transmitting the temporary authorization to the designated third-party comprises emailing the temporary authorization to an email account designated by the consumer.

9. The method of claim 6, wherein transmitting the temporary authorization to the third-party comprises embedding the temporary authorization as a parameter in uniform resource locator and re-directing a browser operated by the consumer to a web page associated with the third-party using the uniform resource locator; and wherein a server hosting the web page is configured to extract the temporary authorization from the uniform resource locator and to transmit a request for access to the information account along with the temporary authorization on behalf of the third-party.

10. The method of claim 6, wherein transmitting the temporary authorization to the third-party comprises storing the temporary authorization in a second information account stored in the central data repository and associated with the third-party.

11. The method of claim 1, wherein the information account stores the consumer information elements as a tagged data structure.

12. A computer-implemented method for providing access to consumer information comprising:

presenting to a host server via a distributed computer network a request for access by a consumer to an information account along with consumer authentication information, the information account being stored in a central data repository that is accessible by the host server via the distributed computer network, the information account containing consumer information elements that are changed by the consumer;

receiving from the host server an acknowledgment that the consumer has been authenticated based on the consumer authentication information and thereby granted access to the information account;

in response to the acknowledgment, transmitting to the host server a request by the consumer for generation of a temporary authorization having consumer-defined attributes that define access privileges that are granted to a person who presents the temporary authorization along with a subsequent request for access to the information account;

receiving the temporary authorization from the distributed computer network with an authentication module running on the host server;

comparing the temporary authorization to data in an authentication table associated with the information account using the authentication module in order to determine at least one of: whether the temporary authorization is being used by an authorized party who is not the consumer, whether the temporary authorization has expired, and what level of access to the information account is associated with the temporary authorization; and granting a level of access to the information account with the authentication module based on the temporary authorization if the temporary authorization is found valid based on the comparing step.

13. A computer readable medium having stored thereon computer executable instructions for performing the method of claim 12.

14. The method of claim 12, wherein the consumer-defined attributes comprise at least one of the access privileges relating to: a number of times that the temporary authorization may be used to access the information account, a period of validity associated with the temporary authorization, a type of the consumer information elements that can be accessed, and a specification of read, write and/or modify privileges.

15. The method of claim 12, wherein the consumer-defined attributes include a filter identifier that identifies a filter to be used to ensure that only authorized data is filtered for release to the party who presents the temporary authorization.

16. The method of claim 12, further comprising the steps of:

receiving the temporary authorization from the host server; and presenting the temporary authorization to the consumer for delivery to a third-party.

17. The method of claim 12, wherein the host server generates the temporary authorization and transmits the temporary authorization to a designated third-party on behalf of the consumer.

18. A computer readable medium having stored thereon computer executable instructions for performing the method of claim 17.

19. The method of claim 17, wherein transmitting the temporary authorization to the designated third-party comprises emailing the temporary authorization to an email account designated by the consumer.

20. The method of claim 17, wherein transmitting the temporary authorization to the third-party comprises embedding the temporary authorization as a parameter in a uniform resource locator and redirecting a browser operated by the consumer to a web page associated with the third-party using the uniform resource locator; and
wherein a server hosting the web page is configured to extract the temporary authorization from the uniform resource locator and to transmit a request for access to the information account along with the temporary authorization on of the third-party.

21. The method of claim 17, wherein transmitting the temporary authorization to the third-party comprises storing the temporary authorization in a second information account stored in the central data repository and associated with the third-party.

22. The method of claim 12, wherein the information account stores the consumer information elements as a tagged data structure.

23. A computer-implemented method for providing access to consumer information via a distributed computer network comprising:
receiving a request with a first server for access to an information account and consumer authentication information from a client device executing a browser, the information account being stored in a central data repository and containing consumer information elements that are changed by the consumer;
authenticating the consumer with the first server to access the information account based on the consumer authentication information;
in response to authenticating the consumer by the first server to access the information account based on the consumer authentication information, generating a temporary authorization with an authentication module running on the first server having consumer-defined attributes that define access privileges that are granted to an entity that presents the temporary authorization along with a further request for access to the information account;
embedding the temporary authorization as a parameter in a uniform resource locator with the authentication module and redirecting the browser of the client device with the first server to a web page hosted by a second server and associated with a third-party using the uniform resource locator;
subsequently receiving a communication with the first server from the second server hosting the web page comprising the further request for access to the information account along with the temporary authorization; and
in response to receiving the temporary authorization with the first server, authenticating the third-party with the authentication module to access the information account according to the access privileges associated with the temporary authorization.

24. A computer readable medium having stored thereon computer executable instructions for performing the method of claim 23.

25. The method of claim 23, wherein the consumer-defined attributes comprise at least one of the access privileges relating to: a number of times that the temporary authorization may be used to access the information account, a period of validity associated with the temporary authorization, a type of the consumer information elements that can be accessed, and a specification of read, write and/or modify privileges.

26. The method of claim 23, wherein the consumer-defined attributes include a filter identifier that identifies a filter to be used to ensure that only authorized data is filtered for release to the party who presents the temporary authorization.

27. The method of claim 23, wherein the information account stores the consumer information elements as a tagged data structure.

28. The method of claim 23, wherein the communication from the second server is generated by a server-side application.

29. The method of claim 28, wherein the communication conforms with Simple Object Access Protocol.

30. A compute system for providing access to consumer information comprising:
a central data repository accessible via a distributed computer network for storing an information account containing consumer information elements that are changed accessed, retrieved and altered by the consumer;
a communication device for receiving from the consumer via the distributed computer network consumer authentication information, a request for a temporary authorization and consumer-defined attributes defining access privileges that are granted to a person who presents the temporary authorization along with a request for further access to the information account; and
a processor configured for executing computer-executable instructions for:
in response to receiving the consumer, authentication information, accessing an authentication table to determine whether the consumer authentication information is associated with the information account, such that the consumer may be provided with access to the information account,
in response to determining that the consumer authentication information is associated with the information account and in response to the request for the temporary authorization, generating the temporary authorization having the consumer-defined attributes;
receiving the temporary authorization from the distributed computer network;
comparing the temporary authorization to data in the authentication table associated with the information account in order to determine at least one of: whether the temporary authorization is being used by at least one of an authorized person and authorized third-party who is not the consumer, whether the temporary authorization has expired, and what level of access to the information account is associated with the temporary authorization; and granting a level of access to the information account based on the temporary authorization if the temporary authorization is found valid based on the comparing step.

31. The system of claim 30, wherein the consumer-defined attributes comprise at least one of the access privileges relating to: a number of times that the temporary authorization may be used to access the information account, a period of validity associated with the temporary authorization, a type of the consumer information elements that can be accessed, and a specification of read, write and/or modify privileges.

32. The system of claim 30, wherein the consumer-defined attributes include a filter identifier that identifies a filter to be used to ensure that only authorized data is filtered for release to the party who presents the temporary authorization.

33. The system of claim 30, wherein the processor is further configured for executing computer-executable instructions for transmitting the temporary authorization to the consumer for delivery to a third-party.

34. The system of claim 30, wherein the processor is further configured for executing computer-executable instructions for transmitting the temporary authorization to a designated third-party on behalf of the consumer.

35. The system of claim 34, wherein transmitting the temporary authorization to the designated third-party comprises emailing the temporary authorization to an email account designated by the consumer.

36. The system of claim 34, wherein transmitting the temporary authorization to the third-party comprises embedding the temporary authorization as a parameter in a uniform resource locator and re-directing a browser operated by the consumer to a web page associated with the third-party using the uniform resource locator; and
wherein a server hosting the web page is configured to extract the temporary authorization from the uniform resource locator and to transit a request for access to the information account along with the temporary authorization on behalf of the third-party.

37. The system of claim 34, wherein transmitting the temporary authorization to the third-party comprises storing the temporary authorization in a second information account stored in the central data repository and associated with the third-party.

38. The system of claim 30, wherein the information account stores the consumer information elements as a tagged data structure.

39. A computer-implemented method for providing access to an information account, comprising the steps of:
storing the information account on a central data repository;
receiving with a server, over a distributed computer network, requests from different network devices for access to the information account, each of said requests comprising an authorization identifier;
in response to each of the requests, comparing each authorization identifier to data in an authentication table associated with the information account using an authentication module running on the server in order to determine at least one of: whether the authorization identifier is being used by an authorized party who is not the consumer, whether the authorization identifier has expired, and what level of access to the information account is associated with the authorization identifier;
if the comparing step is successful for a particular authorization identifier, then retrieving a set of authorization parameters associated with the particular authorization identifier using the authentication module, said authorization parameters being defined by the entity whose information is stored in the information account; and
granting access to each of the network devices the authentication module if the comparing step is successful and in accordance with the authorization parameters retrieved in response to the network device's request.

40. The method of claim 39, wherein said authorization parameters specify a number of times the authorization identifier can be used to access the information account.

41. The method of claim 39, wherein said authorization parameters specify a period of time over which the authorization identifier can be used to access the information account.

42. The method of claim 39, wherein said authorization parameters specify what portion of the information account can be accessed.

43. The method of claim 39, wherein said authorization parameters specify whether the requestor is authorized to write information to the information account and whether the requestor is authorized to modify existing information in the information account.

44. The method of claim 39, further comprising the steps of:
receiving, over the distributed computer network, a request to define access privileges to the information account for a specified network device;
authenticating the request to define access privileges;
storing a set of authorization parameters specifying the access privileges for the specified network device;
associating an authorization identifier with the stored set of authorization parameters; and
transmitting the authorization identifier to the specified network device, said authorization identifier thereafter being useable to provide the specified network device with access to the information account according to the stored set of authorization parameters.

45. The method of claim 44, wherein said step of transmitting the authorization identifier to the specified network device comprises the step of transmitting the authorization identifier to an account associated with the specified network device.

46. The method of claim 44, wherein said step of transmitting the authorization identifier to the specified network device comprises the step of storing the authorization identifier in an electronic account associated with the specified network device.

47. The method of claim 44, wherein said step of transmitting the authorization identifier to the specified network device comprises the steps of embedding the authorization identifier in a network address tag, and transmitting the network address tag to a remote browser, such that the browser is redirected to the specified network device, thereby permitting the specified network device to extract the authorization identifier.

48. A system for providing access to an information account, comprising:
a data repository storing an information account;
a computer network interface for receiving, over a distributed computer network, requests from different network devices for access to the information account, each of said requests comprising an authorization identifier; and
a processor for comparing each authorization identifier to data in an authentication table associated with the information account in order to determine at least one of: whether the authorization identifier is being used by an authorized party who is not the entity whose information is stored in the information account whether the authorization identifier has expired, and what level of access to the information account is associated with the authorization identifier, said processor configured to retrieve a set of authorization parameters associated with the authorization identifier if a comparison between a respective authorization identifier and data in the authentication table is successful, said processor granting access to each of the network devices in accordance with the authorization parameters retrieved in response to the network device's request and if a comparison between a respective authorization identifier and data in the authentication table is successful; wherein said authorization parameters are defined by the entity whose information is stored in the information account.

49. The system of claim 48, wherein said authorization parameters specify a number of times the authorization identifier can be used to access the information account.

50. The system of claim 48, wherein said authorization parameters specify a period of tine over which the authorization identifier can be used to access the information account.

51. The system of claim 48, wherein said authorization parameters specify what portion of the information account can be accessed.

52. The system of claim 48, wherein said authorization parameters specify whether the requester is authorized to write information to the information account and whether the requester is authorized to modify existing information in the information account.

53. The system of claim 48, wherein said network interface is configured to receive, over the distributed computer network, a request to define access privileges to the information account for a specified network device, and wherein said processor is further configured to store a set of authorization parameters specifying the access privileges for the specified network device, associate an authorization identifier with the stored set of authorization parameters, and provide the authorization identifier to the specified network device, said authorization identifier thereafter being useable to provide the specified network device with access to the information account according to the stored set of authorization parameters.

54. The system of claim 53, wherein the authorization identifier is provided to the specified network device by transmitting the authorization identifier to an account associated with the specified network device.

55. The system of claim 53, wherein the authorization identifier is provided to the specified network device by storing the authorization identifier in an electronic account associated with the specified network device.

56. The system of claim 53, wherein the authorization identifier is provided to the specified network device by embedding the authorization identifier in a network address tag and transmitting the network address tag to a remote browser, such that the browser is redirected to the specified network device, thereby permitting the specified network device to extract the authorization identifier.

57. A computer-implemented method for providing selective access to a consumer information account, the method comprising the steps of:

storing data for a consumer information account;

providing an interface whereby an owner of the consumer information account can specify the terms by which third parties can access the consumer information account;

storing the terms for future use in an authentication module of a server;

associating the stored terms with one or more authorization tickets;

transmitting the authorization tickets to specified third parties;

receiving the authorization tickets from a distributed computer network;

comparing the authorization tickets to data in the authentication table associated with the consumer information account using the authentication module in order to determine at least one of: whether the authorization ticket is being used by an authorized third-party who is not the consumer, whether the temporary authorization has expired, and what level of access to the information account is associated with the temporary authorization; and granting a level of access to the consumer information account based on the authorization ticket if the authorization ticket is found valid based on the comparing step.

58. The method of claim 57, further comprising the steps of:

receiving requests from the third parties for access to the consumer information account, each of the requests comprising an authorization ticket;

in response to each of the requests, retrieving the stored terms associated therewith; and granting the third parties access to the consumer information account in accordance with the stored terms associated with the third party's authorization ticket.

59. The method of claim 57, wherein each of said authorization tickets is associated with a set of authorization parameters.

* * * * *